United States Patent
Okamura

(10) Patent No.: US 10,610,781 B2
(45) Date of Patent: Apr. 7, 2020

(54) GAME SYSTEM, STORAGE CONTROL DEVICE, AND INFORMATION STORAGE MEDIUM

(71) Applicant: KONAMI DIGITAL ENTERTAINMENT CO., LTD., Tokyo (JP)

(72) Inventor: Noriaki Okamura, Minato-ku (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 626 days.

(21) Appl. No.: 15/267,103

(22) Filed: Sep. 15, 2016

(65) Prior Publication Data

US 2017/0001116 A1 Jan. 5, 2017

Related U.S. Application Data

(63) Continuation of application No. PCT/JP2015/055786, filed on Feb. 27, 2015.

(30) Foreign Application Priority Data

Mar. 18, 2014 (JP) .................................. 2014-054405

(51) Int. Cl.
*A63F 9/24* (2006.01)
*A63F 13/49* (2014.01)
(Continued)

(52) U.S. Cl.
CPC .............. *A63F 13/49* (2014.09); *A63F 13/20* (2014.09); *A63F 13/25* (2014.09); *A63F 13/32* (2014.09);
(Continued)

(58) Field of Classification Search
CPC .................................. A63F 13/10; A63F 13/12
See application file for complete search history.

(56) References Cited

U.S. PATENT DOCUMENTS

2009/0197684 A1* 8/2009 Arezina .............. G07F 17/3216
463/42
2009/0227375 A1* 9/2009 Weisman ................ A63F 13/12
463/41
(Continued)

FOREIGN PATENT DOCUMENTS

JP 2009-207718 A 9/2009
JP 2012-217861 A 11/2012
(Continued)

OTHER PUBLICATIONS

English Translation of International Search Report for PCT/JP2015/055786 dated Apr. 28, 2015.

*Primary Examiner* — James S. McClellan
*Assistant Examiner* — Kevin M Carter
(74) *Attorney, Agent, or Firm* — HEA Law PLLC

(57) ABSTRACT

A game system comprising at least one processor configured to: obtain saved data of a first game, the saved data being stored in a storage included in a first game terminal that executes the first game; determine whether a second game that is executed in a second game terminal is played by a user of the first game terminal; and perform a control for storing, in a server device, the saved data of the first game stored in the storage based on a determination result of the determination.

9 Claims, 18 Drawing Sheets

(51) Int. Cl.
  *A63F 13/795* (2014.01)
  *A63F 13/79* (2014.01)
  *A63F 13/20* (2014.01)
  *A63F 13/25* (2014.01)
  *A63F 13/32* (2014.01)
  *A63F 13/335* (2014.01)
  *A63F 13/35* (2014.01)

(52) U.S. Cl.
  CPC ............ *A63F 13/335* (2014.09); *A63F 13/35* (2014.09); *A63F 13/79* (2014.09); *A63F 13/795* (2014.09); *A63F 2300/406* (2013.01); *A63F 2300/407* (2013.01); *A63F 2300/55* (2013.01)

(56) References Cited

U.S. PATENT DOCUMENTS

| | | | | |
|---|---|---|---|---|
| 2010/0292008 | A1* | 11/2010 | Matsumura | A63F 13/10 463/36 |
| 2012/0004026 | A1* | 1/2012 | Vann | G06Q 30/02 463/25 |
| 2012/0258800 | A1 | 10/2012 | Mikhailov | |
| 2012/0315993 | A1* | 12/2012 | Dumont | G07F 17/3225 463/42 |
| 2013/0260877 | A1* | 10/2013 | Katagai | A63F 13/63 463/29 |
| 2013/0310159 | A1* | 11/2013 | Froy | G07F 17/3218 463/25 |
| 2013/0316832 | A1* | 11/2013 | Olofsson | G07F 17/3204 463/42 |
| 2014/0038721 | A1* | 2/2014 | Archer | A63F 13/795 463/42 |
| 2014/0349753 | A1* | 11/2014 | Imai | A63F 13/10 463/31 |
| 2015/0111643 | A1* | 4/2015 | Olofsson | A63F 13/335 463/31 |

FOREIGN PATENT DOCUMENTS

| | | | |
|---|---|---|---|
| JP | 2013-226324 A | 11/2013 | |
| JP | 2014-045815 A | 3/2014 | |
| WO | WO-2013174933 A1 * | 11/2013 | ......... G07F 17/3204 |

* cited by examiner

FIG.4
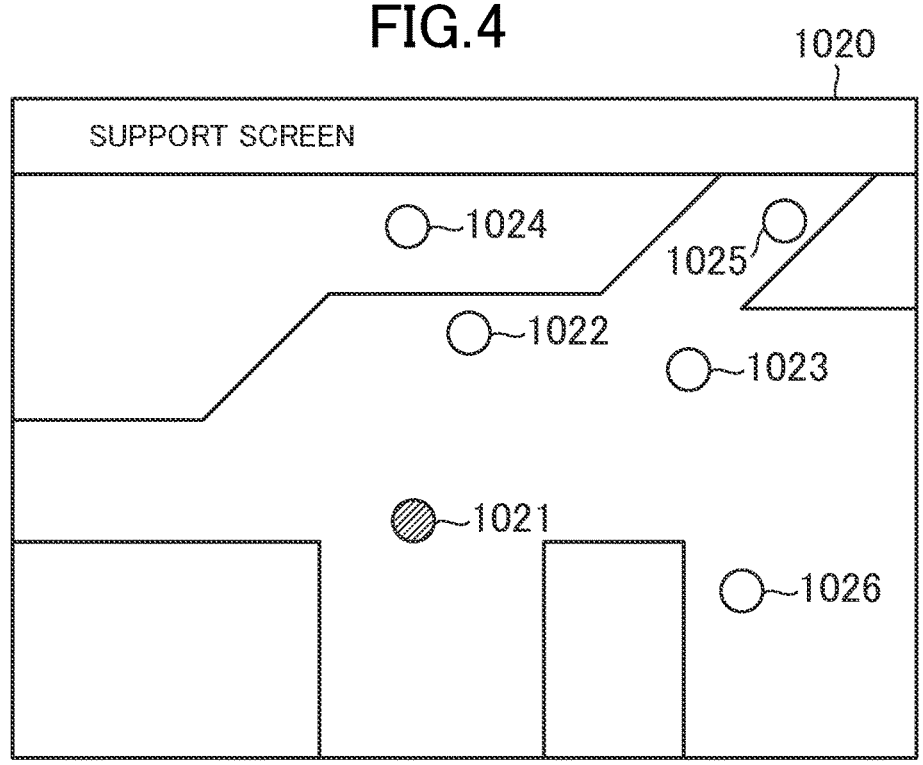
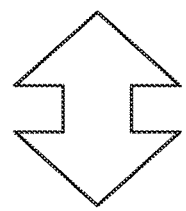

FIG.7

| SAVED DATA | DATE AND TIME INFORMATION |
|---|---|
| SAVED DATA A1 | 20:15,3/18/2014 |
| SAVED DATA A2 | 16:00,3/17/2014 |
| ⋮ | ⋮ |

FIG.8

| ACCOUNT | STATUS INFORMATION | PLAY INFORMATION |
|---------|--------------------|--------------------|
| u000001 | ON-LINE | PLAY INFORMATION A |
| u000002 | OFF-LINE | PLAY INFORMATION B |
| u000003 | OFF-LINE | PLAY INFORMATION C |
| ⋮ | ⋮ | ⋮ |

FIG.9

| ACCOUNT | SAVED DATA | DATE AND TIME INFORMATION |
|---------|------------|---------------------------|
| u000001 | SAVED DATA A1 | 20:15,3/18/2014 |
| u000002 | SAVED DATA B2 | 15:45,3/17/2014 |
| u000003 | SAVED DATA C3 | 18:20,3/18/2014 |
| ⋮ | ⋮ | ⋮ |

GAME SYSTEM, STORAGE CONTROL DEVICE, AND INFORMATION STORAGE MEDIUM

CROSS-REFERENCE TO RELATED APPLICATION

The present disclosure contains subject matter related to that disclosed in Japanese Patent Application JP2014-054405 filed in the Japan Patent Office on Mar. 18, 2014 and International Patent Application PCT/JP2015/055786 filed in the Japan Patent Office on Feb. 27, 2015, the entire contents of which are hereby incorporated by reference.

BACKGROUND OF THE INVENTION

1. Field of the Invention

The present invention relates to a game system, a storage controlling device, and an information storage medium.

2. Description of the Related Art

Game systems for enabling a user to play multiple games have been known. For example, JP2013-226324A describes a system for allowing the same user to play both of a first game and a second game by executing the first game (e.g., prize lottery game) at a first game terminal (e.g., mobile phone) and the second game (e.g., slot game) at a second game terminal (e.g., game machine for business use).

SUMMARY OF THE INVENTION

The technology described above requires a user who plays a first game to also play a second game.

One or more embodiments of the present invention have been conceived in view of the above, and an object thereof is to provide a game system, a storage controlling device, and an information storage medium capable of inducing a user of a first game terminal that executes a first game to also play a second game.

In order to solve the above described problems, a game system according to the present invention includes at least one processor configured to: obtain saved data of a first game, the saved data being stored in a storage included in a first game terminal that executes the first game; determine whether a second game that is executed in a second game terminal is played by a user of the first game terminal; and perform a control for storing, in a server device, the saved data of the first game stored in the storage based on a determination result of the determination.

A storage controlling device according to the present invention includes at least one processor configured to: obtain saved data of a first game, the saved data being stored in a storage included in a first game terminal that executes the first game; obtain a determination result that indicates whether a second game that is executed in a second game terminal is played by a user of the first game terminal; and perform a control for storing, in a server device, the saved data of the first game stored in the storage based on the determination result.

BRIEF DESCRIPTION OF THE DRAWINGS

FIG. 4 is a diagram illustrating a relationship between a support screen displayed on a portable game terminal and a main game screen displayed on a display device;

FIG. 7 is a diagram illustrating an example of data storage of saved data;

FIG. 8 is a diagram illustrating an example of storage of play information, for example;

FIG. 9 is a diagram illustrating an example of data storage of saved data in a backup server;

DETAILED DESCRIPTION OF THE INVENTION

1. First Embodiment

An embodiment (hereinafter First Embodiment) of the present invention will be described below in detail with reference to the accompanying drawings. Each of the first game terminal and the second game terminal according to the present invention may be applied to various information processing devices, for example, portable terminals such as a mobile phone (including smartphone and feature phone), a PDA, a tablet terminal, and a notebook computer, a stationary game machine for home use, a stationary game machine for business use, and a desktop personal computer. In the first embodiment, a case will be discussed where the first game terminal is applied to a mobile game terminal, and the second game terminal is applied to a stationary game terminal.

[1-1. Example of Game System Configuration]

Figure 1:
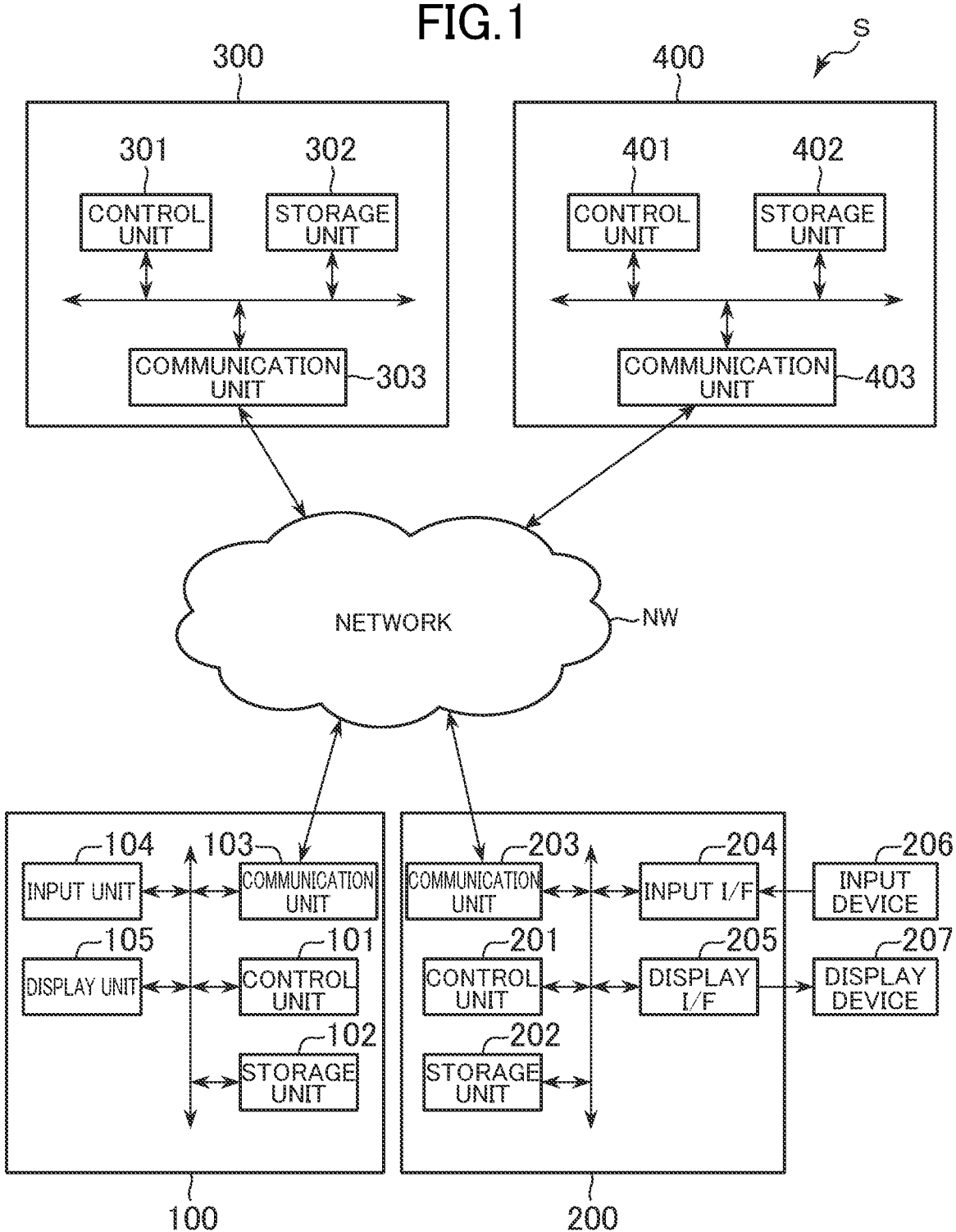
FIG. 1 is a diagram illustrating an example of system configuration of a game system according to a first embodiment.

FIG. 1 is a diagram illustrating a configuration of the game system according to the first embodiment. As shown in FIG. 1, the game system S includes a portable game terminal 100, a stationary game terminal 200, a game server 300, and a backup server 400. The portable game terminal 100, the stationary game terminal 200, the game server 300, and the backup server 400 are respectively connected to a network NW and capable of mutual data communication. In the following, a hardware configuration of each computer included in the game system S will be discussed.

The portable game terminal 100 is a computer in a size that a user can carry around, such as a smartphone. As shown in FIG. 1, the portable game terminal 100 includes a control unit 101, a storage unit 102, a communication unit 103, an input unit 104, and a display unit 105.

The control unit 101 including a CPU (Central Processing Unit) performs arithmetic processing and controls each unit of the portable game terminal 100 based on a program stored in the storage unit 102.

The storage unit 102 stores control programs, such as an operating system of the portable game terminal 100, game programs, and various types of data, and also is used as a work memory of the control unit 101. The programs and data may be provided to the portable game terminal 100 by being stored in an information storage medium, such as a flash memory, or through a data communication network, such as the Internet.

The communication unit 103 is connected to the network NW by wire or wireless, and communicates with the game server 300 and the backup server 400 connected to the network NW. For example, the communication unit 103 may include a mobile communication antenna for mobile communication, communicate with abase station device (not shown) wirelessly by the mobile communication antenna, and connect to the network NW via the base station device. Further, the communication unit 103 may include a communication antenna for a wireless LAN, communicate with an access point (not shown) wirelessly by the communication antenna, and connect to the network NW via the access point.

The input unit 104 is implemented by an input device such as a touch panel and a keyboard, and receives an operation input from a user. The display unit 105 is implemented by a display device such as a liquid crystal display, and displays a result (screen) of information processing by the control unit 101.

The stationary game terminal 200 is a computer, such as a game machine located at a home of a user, for example. The stationary game terminal 200 includes a control unit 201, a storage unit 202, a communication unit 203, an input interface 204, and a display interface 205. The control unit 201, the storage unit 202, and the communication unit 203 of the stationary game terminal 200 are respectively the same as the control unit 101, the storage unit 102, and the communication unit 103 of the portable game terminal 100 in their hardware configuration, and thus the detailed explanation will be omitted.

The input interface 204 is connected by wire or wireless to the input device 206, such as a game controller and a keyboard, and receives an operation input from a user who operates the input device 206. The display interface 205 is connected by wire or wireless to the display device 207, such as a liquid crystal display, and displays a result (screen) of information processing by the control unit 101 on the display device.

The game server 300 is a server computer. The game server 300 includes a control unit 301, a storage unit 302, and a communication unit 303. The control unit 301, the storage unit 302, and the communication unit 303 are respectively the same as the control unit 101, the storage unit 102, and the communication unit 103 of the portable game terminal 100 in their hardware configuration, and thus the detailed explanation will be omitted. The game server 300 obtains and stores data relating to games executed by the stationary game terminal 200 via the network NW, and provides various services to the stationary game terminal 200. In order that the stationary game terminal 200 sends data relating to games to the game server 300 and the user receives various services, the user performs a predetermined user registration to make the game server 300 issue a user account. The game server 300 permits the user whose user account is issued to send the data and receive the various services. For example, the game server 300 is under the management of a company that manufactures and sells the stationary game terminal 200.

The backup server 400 is a server computer. The backup server 400 includes a control unit 401, a storage unit 402, and a communication unit 403. The control unit 401, the storage unit 402, and the communication unit 403 are respectively the same as the control unit 101, the storage unit 102, and the communication unit 103 of the portable game terminal 100 in their hardware configuration, and thus the detailed explanation will be omitted. The backup server 400 is to back up saved data of games executed in the portable game terminal 100, and controlled under the management of a company that manufactures and sells games executed in the portable game terminal 100, for example. In this regard, however, there is a case where the backup server 400 is under the management of a company that manufactures and sells the stationary game terminal 200. Here, to back up means to store a copy of data stored in storing means in another storing means.

[1-2. Overview of First Game and Second Game]

The portable game terminal 100 executes a first game, and the stationary game terminal 200 executes a second game. In the first embodiment, a case is discussed in which a first game and a second game are related to each other, although the first game and the second game may not be related to each other. "Related to each other" means, for example, content of the games have some relevance to each other. For example, having common characters, places, or visions of the world in the games, or the stories being relevant corresponds to the games being related to each other.

In the first embodiment, the first game is a game related to a part of a story progressing in the second game. In the following, the first game is referred to as a sub game, and the second game is referred to as a main game. For example, the main game is a game in which a character operated by a user battles against an enemy in a game space imitating a battlefield, and the sub game is a game in which a base located in the game space is developed.

When a predetermined operation is performed at the portable game terminal 100 while the main game is played in the stationary game terminal 200, a support screen for supporting a play in the main game being executed can be displayed in addition to the sub game. For example, when the user starts a game program in the portable game terminal 100, the display unit 105 displays a menu screen for enabling the user to select either displaying a support screen or playing a sub game.

Figure 2:
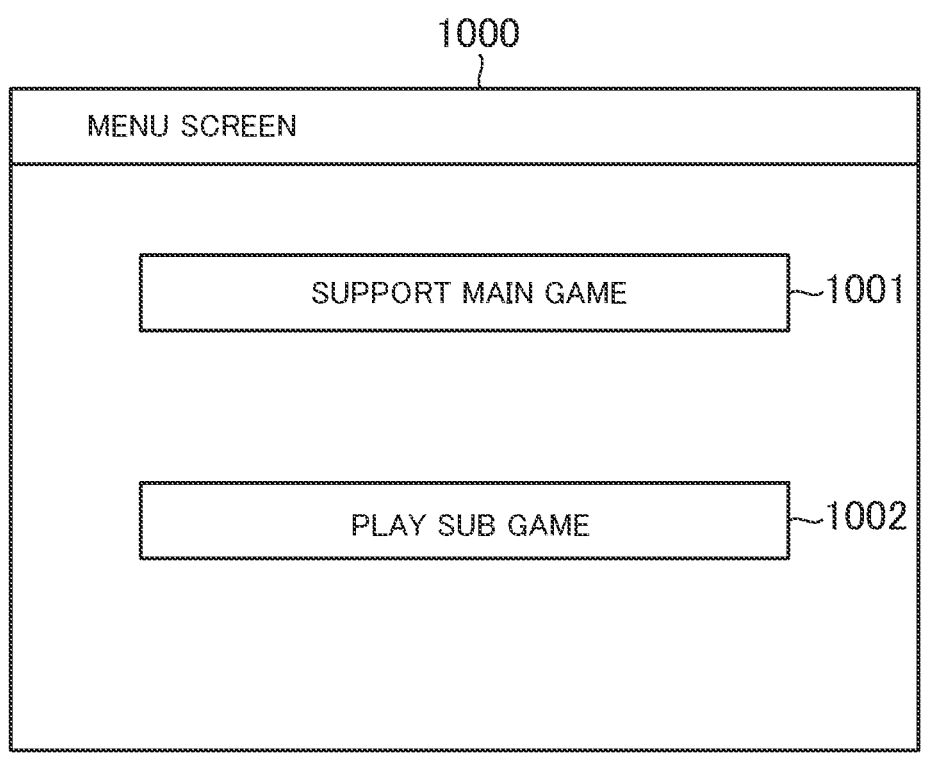
FIG. 2 is a diagram illustrating an example of a menu screen displayed on a display unit.

FIG. 2 is a diagram illustrating an example of a menu screen displayed on the display unit 105 of the portable game terminal 100. As shown in FIG. 2, the menu screen 1000 displays a support icon 1001 for displaying a support screen and a sub game icon 1002 for playing a sub game. When the user selects the support icon 1001, processing for displaying the support screen starts. In this regard, the support screen is a screen for supporting a main game, and thus cannot be displayed unless the main game is being played in the stationary game terminal 200.

In the first embodiment, the game server 300 is configured to determine whether the main game is being played in the stationary game terminal 200 when the user selects the support icon 1001. The game server 300 enables the user to log in the game server 300 from the portable game terminal 100 and log in the game server 300 from the stationary game terminal 200, so as to determine the main game is being played as described above. When the user selects the support icon 1001, the display unit 105 displays a log-in screen to log in the game server 300.

Figure 3:
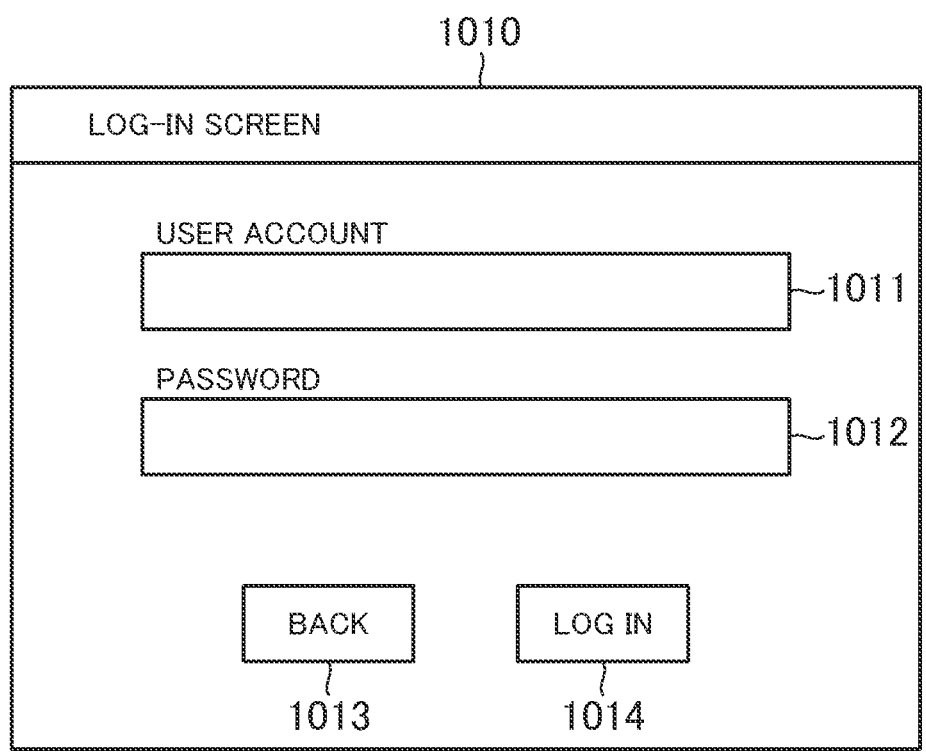
FIG. 3 is a diagram illustrating an example of a log-in screen.

FIG. 3 is a diagram illustrating an example of a log-in screen displayed on the display unit 105 of the portable game terminal 100. As shown in FIG. 3, the log-in screen 1010 displays an input form 1011 to enter a user account, and an input form 1012 to enter a password. The user enters a user account in the input form 1011 and a password in the input form 1012 and selects a log-in icon 1014, then the entered user account and password are sent to the game server 300 to execute log-in processing. When the user selects "Back" icon 1013, the screen return to the menu screen 1000.

Before the log-in processing of the portable game terminal 100, the user needs to log in the game server 300 from the stationary game terminal 200 by entering the user account and the password in the stationary game terminal 200 as described above. In this regard, the user account and the password may be stored in the storage unit 202 in advance so as to automatically log in the game server 300 from the stationary game terminal 200 with use of the user account and the password stored in the storage unit 202 at the time when the stationary game terminal 200 is started. After the log-in from the stationary game terminal 200 to the game server 300 has been completed, information relating to the game executed in the stationary game terminal 200 is uploaded at any time to the game server 300. Using the uploaded information, the game server 300 can specify which user plays the main game.

When the game server 300 determines that the user who has selected the support icon 1001 is playing the main game in the stationary game terminal 200, the game server 300 requests the portable game terminal 100 and the stationary game terminal 200 to establish mutual communication. When communication between the portable game terminal 100 and the stationary game terminal 200 is established, the stationary game terminal 200 sends data indicating the situation of the main game being executed to the portable game terminal 100, and the display unit 105 of the portable game terminal 100 displays a support screen.

FIG. 4 is a diagram illustrating a relationship between a support screen displayed on the display unit 105 of the portable game terminal 100 and a main game screen displayed on the display device 207. As shown in FIG. 4, the main game screen 2000 displays the situation of the main game being executed, for example, the current state of the game space in the main game. Here, the main game screen 2000 displays an image indicating the game space viewed from a character, which is the user's operating target. For example, enemy characters 2001 and 2002 in the view field of the user's operating target are displayed.

On the support screen 1020, for example, a map of the entire game space is displayed. The support screen 1020 displays an operating target image 1021 indicating a position of the user's operating target in the game space so that the state around the user's operating target can be viewed. The enemy characters 1022 and 1023 displayed on the support screen 1020 are images respectively indicating positions of the enemy characters 2001 and 2002. The support screen 1020 also displays enemy characters 1024 to 1026 indicating the positions of enemy characters that are not recognizable on the main game screen 2000. In other words, the main game screen 2000 displays the surroundings of the character operated by the user, and the support screen 1020 displays a wider area than the area displayed on the main game screen 2000.

The displays of the support screen 1020 and the main game screen 2000 are linked together, and a change in the situation of the main game is reflected in the support screen 1020. For example, in the main game, when a character operated by the user moves in the game space, a map displayed on the support screen 1020 is updated in accordance with the movement of the character. As such, the user can play the main game while viewing the situation, which is not viewable on the main game screen 2000, on the support screen 1020.

Referring back to FIG. 2, when the user selects the sub game icon 1002 on the menu screen 1000, a sub game starts, and the display unit 105 displays a sub game screen. This sub game is executed even if the user is not playing the main game. That is, the user can play only the sub game.

Figure 5:
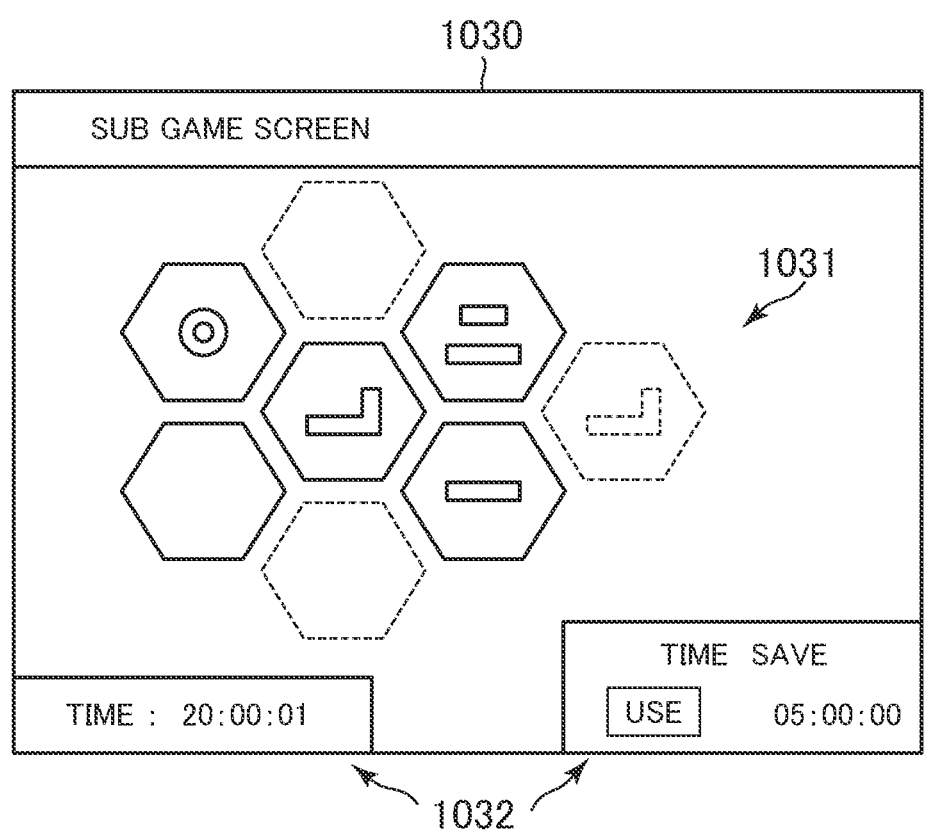
FIG. 5 is a diagram illustrating an example of a sub game screen.

FIG. 5 is a diagram illustrating an example of a sub game screen. As shown in FIG. 5, a sub game screen 1030 indicates a situation of the sub game being executed, for example, the current situation of the game space in the sub game. Here, the sub game in which the user develops a base is executed, and the sub game screen 1030 displays objects 1031 indicating buildings arranged by the user in the base and a game parameter 1032. The user aims at developing the base by increasing the objects 1031 in the game space of the sub game. Additionally, the user may aim at increasing, for example, a parameter indicating the progress of the base or acquiring a character in the sub game.

The saved data of the sub game is stored in the storage unit 102 of the portable game terminal 100 at any given time, for example, when the user terminates the play of the sub game. When the user plays the sub game for the next time, the saved data stored in the storage unit 102 is loaded, and thereby, the user can resume the sub game from where the game was terminated previously.

As described above, while the user can play only the sub game even if the user is not playing the main game, a mechanism to induce the user to also play the main game is employed in the game system S of the first embodiment. That is, the game system S of the first embodiment stores the saved data of the sub game in the backup server 400 when the user is playing the main game, and does not store the saved data of the sub game in the backup server 400 when the user is not playing the main game. In the following, processing for implementing such technology will be discussed in detail.

[1-3. Functions Implemented in Game System]

Figure 6:
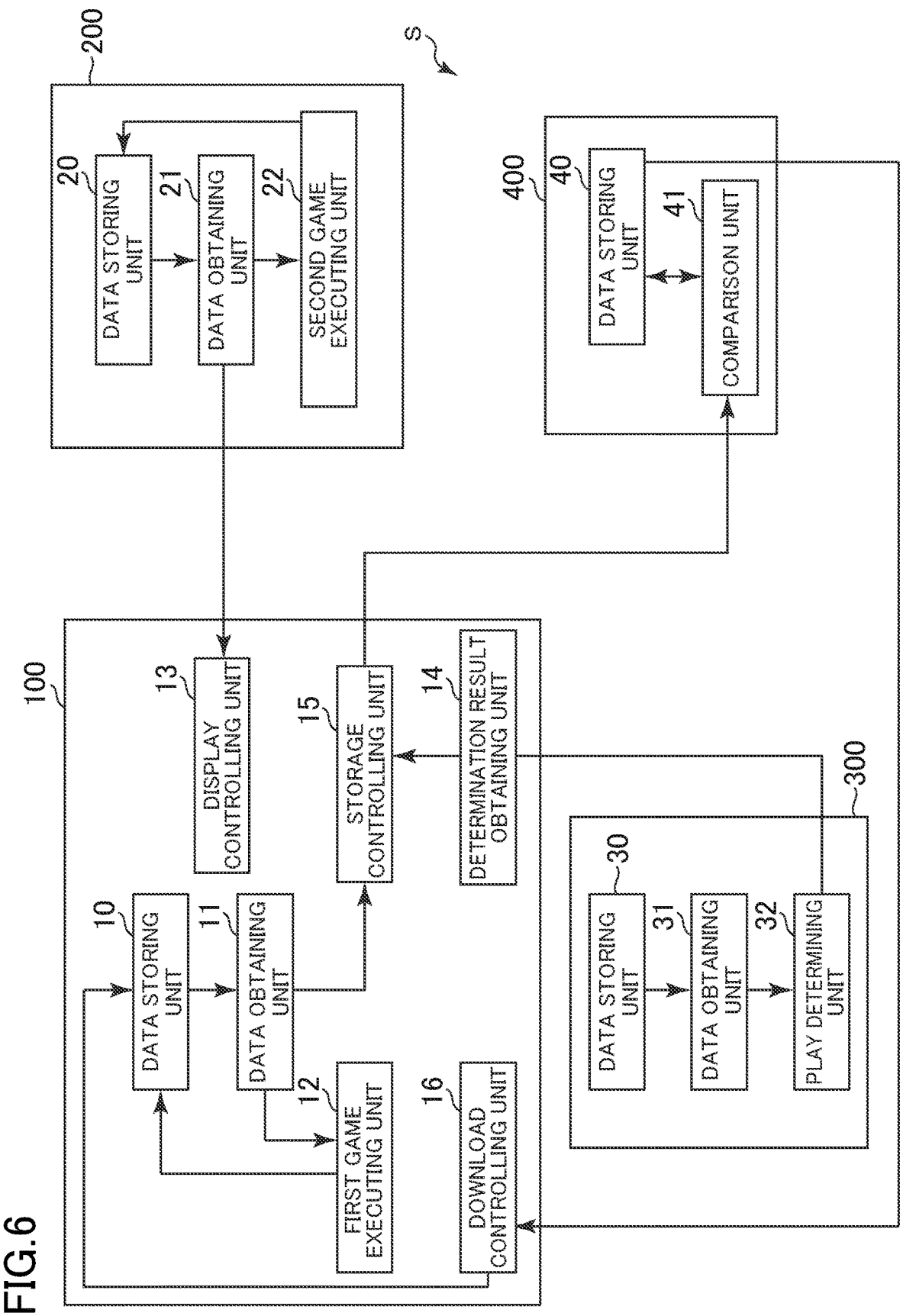
FIG. 6 is a functional block diagram showing the functions implemented in the game system and related to the present invention.

FIG. 6 is a functional block diagram showing the functions implemented in the game system S and related to the present invention.

[1-3-1. Functions Implemented in Portable Game Terminal]

The portable game terminal 100 implements a data storing unit 10, a data obtaining unit 11, a first game executing unit 12, a display controlling unit 13, a determination result obtaining unit 14, a storage controlling unit 15, and a download controlling unit 16.

[Data Storing Unit]

The data storing unit 10 is implemented mainly by the storage unit 102. The data storing unit 10 stores data necessary for executing a sub game. For example, the data storing unit 10 stores game situation data indicating a situation of a sub game being executed and saved data of the sub game. The game situation data includes, for example, data indicating the current situation of the game space in the sub game (i.e., data to display the sub game screen 1030). In other words, the game situation data includes data indicating the current progress of the sub game.

FIG. 7 is a diagram illustrating an example of data storage of saved data. The saved data is data indicating a situation of a sub game at one point of time during a user plays the sub game, and reproducing the situation so as to enable the user to play the sub game from the situation. As shown in FIG. 7, the saved data of the sub game is associated with date and time information relating to a date and time when the saved data is generated. The date and time information indicates a date and time when the saved data is generated, or a date and time before or after the date and time for a predetermined period of time. The date and time information may be a date and time when the user performs an operation to save data, a date and time when the operation is received, a date and time when processing for generating saved data is started, and a date and time when the processing for generating the saved data is finished.

[Data Obtaining Unit]

The data obtaining unit 11 is implemented mainly by the control unit 101. The data obtaining unit 11 obtains saved data of a sub game stored in a data storing unit 10 included in a portable game terminal 100 that executes the sub game. The data obtaining unit 11 may obtain content stored in the data storing unit 10 or game situation data of the sub game.

[First Game Executing Unit]

The first game executing unit 12 is implemented mainly by the control unit 101. The first game executing unit 12 executes a sub game. The first game executing unit 12 generates game situation data based on the saved data obtained by the data obtaining unit 11, and resumes the sub game based on the situation of the game where data was saved previously. For example, the first game executing unit 12 updates game situation data based on the user's operation.

The first game executing unit 12 generates saved data based on game situation data, and stores the generated saved data in the data storing unit 10. Here, the first game executing unit 12 stores the generated saved data in association with date and time information indicating the current date and time in the data storing unit 10. "To associate saved data with date and time information" means to store saved data and date and time information in the same record, and to include date and time information in saved data.

[Display Controlling Unit]

The display controlling unit 13 is implemented mainly by the control unit 101 and the display unit 105. The display controlling unit 13 displays various screens on the display unit 105. For example, if the display controlling unit 13 is capable of data communication with the stationary game terminal 200 executing the main game, the display controlling unit 13 displays a support screen 1020 for supporting a play of the main game on the display unit 105 included in the portable game terminal 100 based on data that relates to the main game and is supplied from the stationary game terminal 200.

"To support a play of the main game" means to enable a user to easily play the main game by displaying information relating to the main game on a screen. For example, "to support a play of the main game" means to display information, which is not displayed on the main game screen 2000, on a screen so as to enable the user to grasp the information that is not displayed on the main game screen 2000. For example, the display controlling unit 13 obtains at least a part of the game situation data of the main game stored in the data storing unit 20. The at least a part of data includes information that is not displayed on the main game screen 2000. The display controlling unit 13 displays the support screen 1020 based on the at least a part of data.

A screen that the display controlling unit 13 displays is not limited to the support screen 1020. In addition, the display controlling unit 13 displays a menu screen 1000, a log-in screen 1010, and a sub game screen 1030 on the display unit 105.

[Determination Result Obtaining Unit]

The determination result obtaining unit 14 is implemented mainly by the control unit 101 and the communication unit 103. The determination result obtaining unit 14 obtains a determination result of the play determining unit 32. The determination result obtaining unit 14 obtains, as a determination result of the play determining unit 32, information indicating that the main game is played by the user of the portable game terminal 100, or information indicating that the main game is not played by the user of the portable game terminal 100, through the network NW.

[Storage Controlling Unit]

The storage controlling unit 15 is implemented mainly by the control unit 101 and the communication unit 103. The storage controlling unit 15 performs a control for storing the saved data of the sub game stored in the data storing unit 10 in the backup server 400 based on the determination result of the play determining unit 32 described below.

In the first embodiment, the storage controlling unit 15 determines whether to permit the backup server 400 to store the saved data of the sub game based on the determination result of the play determining unit 32. As described later, the play determining unit 32 determines whether a main game is played by a user. If it is determined that the main game is not played by the user, the storage controlling unit 15 does not permit the backup server 400 to store the saved data (i.e., restricts backup server 400 from storing the saved data), and if it is determined that the main game is played by the user, the storage controlling unit 15 permits the backup server 400 to store the saved data.

In the first embodiment, if it is determined that the main game is played by the user, the storage controlling unit 15 performs a control for storing the user account and the saved data of the sub game stored in the data storing unit 10 in the backup server 400 in association with each other. For example, if it is determined that the main game is played by the user, the storage controlling unit 15 permits the backup server 400 to store the user account and the saved data in association with each other.

[Download Controlling Unit]

The download controlling unit 16 is implemented mainly by the control unit 101 and the communication unit 103. The download controlling unit 16 obtains the saved data stored in the backup server 400 when the saved data of the sub game is not stored in the data storing unit 10, and stores the obtained saved data in the data storing unit 10. In the first embodiment, the download controlling unit 16 stores the saved data, which is stored in association with the user account entered in the portable game terminal 100, in the data storing unit 10.

For example, the download controlling unit 16 determines whether the saved data of the sub game is stored by referring to the data storing unit 10. The download controlling unit 16 does not download the saved data stored in the backup server 400 when the saved data of the sub game is stored in the data storing unit 10, and downloads the saved data stored in the backup server 400 and stores the downloaded data in the data storing unit 10 when the saved data of the sub game is stored in the data storing unit 10. The first game executing unit 12 resumes the sub game based on the downloaded saved data.

If a comparison result of the comparison unit indicates that the saved data of the sub game stored in the backup server 400 is newer than the saved data stored in the data storing unit 10, the download controlling unit 16 replaces the saved data stored in the data storing unit 10 with the saved data stored in the backup server 400. To replace the saved data is to overwrite the saved data. In this way, the newer saved data is stored in the data storing unit 10.

The download controlling unit 16 may actively or passively obtain the saved data from the backup server 400. "To actively obtain" means that the portable game terminal 100 requests and obtains the backup data from the backup server 400 when the saved data of the sub game is not stored in the portable game terminal 100. "To passively obtain" means that, when the saved data of the main game is not stored in the portable game terminal 100, the backup server 400 unilaterally sends the saved data to the portable game terminal 100 and the portable game terminal 100 obtains such saved data.

[1-3-2. Functions Implemented in Stationary Game Terminal]

The stationary game terminal 200 implements the data storing unit 20, the data obtaining unit 21, and the second game executing unit 22.

[Data Storing Unit]

The data storing unit 20 is implemented mainly by the storage unit 202. The data storing unit 20 stores game situation data that indicates the situation of the main game being executed. The game situation data stores data indicating the current situation (e.g., positions of user's operating target and enemy characters) of the game space in the main game and the current values of game parameters. In other words, the data storing unit 20 stores data for displaying the main game screen 2000 indicating the situation of the main game being executed. The data stored in the data storing unit 20 is not limited to this, but the saved data of the main game may also be stored.

[Data Obtaining Unit]

The data obtaining unit 21 is implemented mainly by the control unit 201. The data obtaining unit 21 obtains content stored in the data storing unit 20. For example, the data obtaining unit 21 obtains data (here, a part of game situation data) required by the portable game terminal 100 to display the support screen 1020 from the data obtaining unit 21.

[Second Game Executing Unit]

The second game executing unit 22 is implemented mainly by the control unit 201. The second game executing unit 22 executes the main game based on the game situation data obtained by the data obtaining unit 21. The second game executing unit 22 updates the game situation data stored in the data storing unit 20. For example, the second game executing unit 22 operates a character of the operating target to act in the game space based on the user's operation, and updates the game situation data based on the result of actions of the character.

[1-3-3. Functions Implemented in Game Server]

The game server 300 implements a data storing unit 30, a data obtaining unit 31, and a play determining unit 32.

[Data Storing Unit]

The data storing unit 30 is implemented mainly by the storage unit 302. The data storing unit 30 stores, for example, play information relating to a play of the main game executed in the stationary game terminal 200. FIG. 8 is a diagram illustrating an example of storage of information, such as play information. As shown in FIG. 8, a user account, which is user identifying information for uniquely identifying a user, status information, and play information are associated with one another. The status information is information indicating the current status of the stationary game terminal 200, and here, indicating whether the stationary game terminal 200 logs in the game server 300. In the following, a status in which the stationary game terminal 200 logs in the game server 300 is described as on-line, and a status in which the stationary game terminal 200 does not log in (logs out from) the game server 300 is described as off-line. The log-in state may be described as an active state, and the log-out state may be described as an inactive state.

The play information includes information relating to the game played by the user in the stationary game terminal 200. For example, the play information includes information for identifying a game executed by the stationary game terminal 200, information indicating a date and time at which the game is played, and information indicating a result of the game. Information included in the play information is not limited to this, but the play information may include information relating to a game executed by the stationary game terminal 200. In addition, for example, the play information may include information for identifying not the game previously played by the user but the game currently played by the user. The play information may include saved data of games executed by the stationary game terminal 200.

The data stored in the data storing unit 30 is not limited to the above example. In addition, the data storing unit 30 stores, for example, a user account, a password, and a token described below in association with one another. When the user logs in the server, authentication is performed by referring to such association.

[Data Obtaining Unit]

The data obtaining unit 31 is implemented mainly by the control unit 301. The data obtaining unit 31 obtains content stored in the data storing unit 30. For example, the data obtaining unit 31 obtains content stored in the data storing unit 30 that stores play information relating to a play performed in the stationary game terminal 200 in association with the user account.

[Play Determining Unit]

The play determining unit 32 is implemented mainly by the control unit 301. The play determining unit 32 determines whether the main game executed in the stationary game terminal 200 is played by a user of the portable game terminal 100. In the first embodiment, the play determining unit 32 determines whether the stationary game terminal 200 is played by a user based on the play information stored in association with a user account entered in the portable game terminal 100.

The user of the portable game terminal 100 is a person who operates the portable game terminal 100 and plays a sub game in the portable game terminal 100. In other words, the user of the portable game terminal 100 is a user who is identified by a user account entered in the portable game terminal 100.

The play determining unit 32 is implemented mainly by the control unit 301. The play determining unit 32 determines whether the play information indicating that the main game is played (play information indicating that the main game is executed) is stored in association with the user account entered by the user who has played the sub game. In other words, the play determining unit 32 determines whether the user account associated with the play information indicating that the main game is played (play information indicating that the main game is executed) matches to the user account entered by the user who has played the sub game.

[1-3-4. Functions Implemented in Backup Server]

The data storing unit 40 and the comparison unit 41 are implemented in the backup server 400.

[Data Storing Unit]

The data storing unit 40 is implemented mainly by the storage unit 402. The data storing unit 40 stores saved data of sub games. FIG. 9 is a diagram illustrating an example of saved data stored in the backup server 400. As shown in FIG. 9, a user account, a saved data item, and a date information item are stored in association with one another.

[Comparison Unit]

The comparison unit 41 is implemented mainly by the control unit 401. The comparison unit 41 compares date and time information, which is associated with saved data of a sub game stored in the data storing unit 40, with date and time information associated with saved data stored in the backup server 400. The comparison unit 41 determines which of the saved data of the sub game stored in the data storing unit and the saved data stored in the backup server 400 is newer or older. The comparison unit 41 sends such comparison result to the download controlling unit 16.

[1-4. Processing Executed in Game System]

Next, the processing executed in the game system S will be discussed. Here, among the processing executed in the game system S, play information storing processing for storing play information in the game server 300 and backup controlling processing for storing saved data in the backup server 400 will be discussed. In the first embodiment, the processing described below is executed so that the functional blocks shown in FIG. 6 are implemented.

[Play Information Storing Processing]

Figure 10:
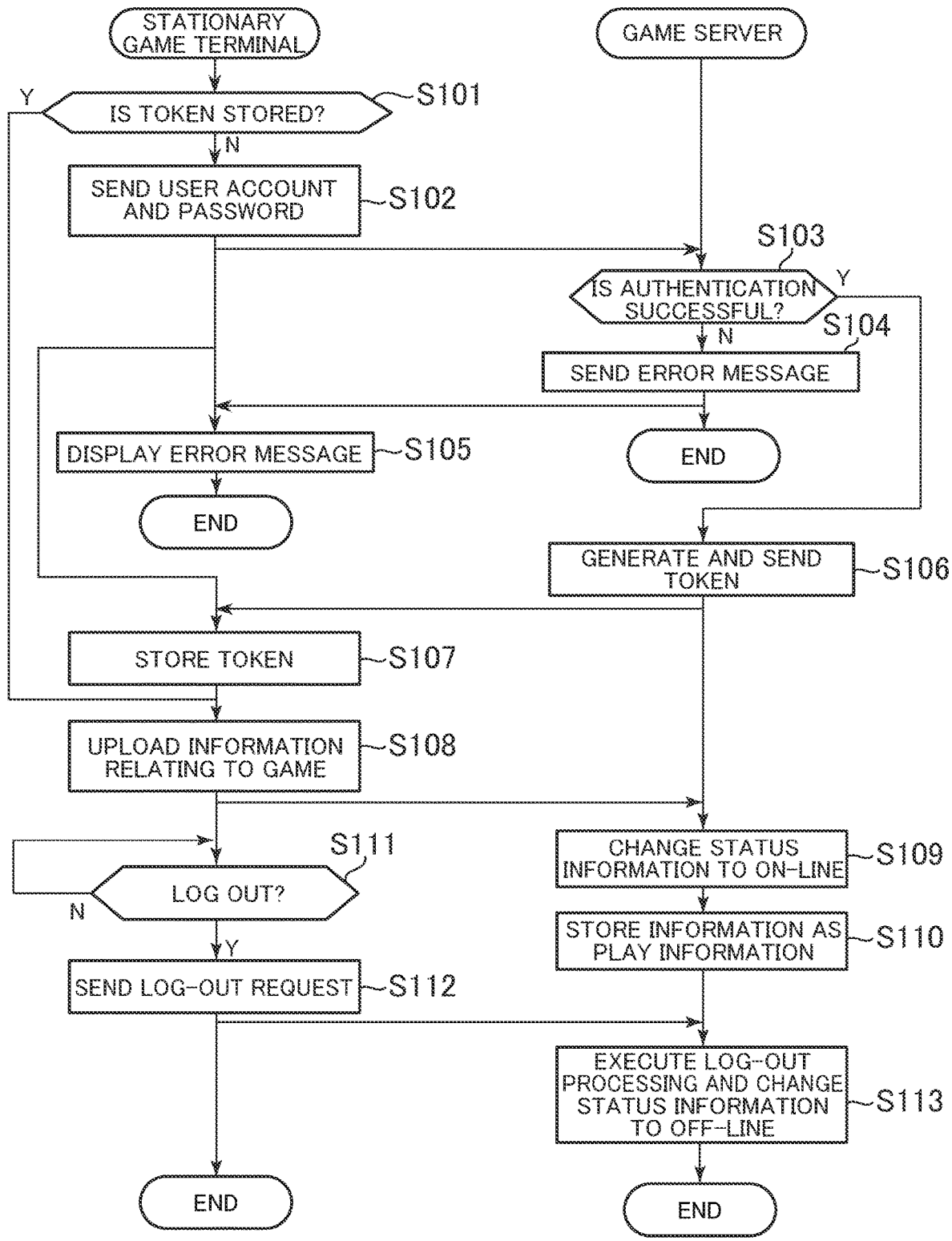
FIG. 10 is a flow chart indicating processing for storing play information.

FIG. 10 is a flow chart showing processing for storing the play information. The play information storing processing is executed when the stationary game terminal 200 logs in the game server 300. For example, the stationary game terminal 200 may log in automatically when it is activated or when a user performs a predetermined operation. The processing shown in FIG. 10 is executed by the control units 201 and 301 respectively operating according to programs stored in the storage units 202 and 302.

As shown in FIG. 10, in the stationary game terminal 200, the control unit 201 determines whether the storage unit 202 stores a token for authentication (S101). A token is specific information issued for a user account of a user when authentication is performed by the game server 300, and is constructed by a character string in a predetermined length. The token may have an expiration date, or a new token may be issued by the user's operation. A token and a user account are in one-to-one relationship. A token also corresponds to information for uniquely identifying a user.

If it is determined that the token is stored in the storage unit 202 (S101; Y), the processing proceeds to processing in S108 described later. In this case, the following processing from S102 to S107 is not executed. That is, the stationary game terminal 200 stores a valid token so that the validity of the user is authenticated without sending a user account and a password to the game server 300.

On the other hand, if it is determined that token is not stored in the storage unit 202 (S101; N), the control unit 201 sends a user account and a password to the game server 300 (S102). In S102, if the stationary game terminal 200 automatically logs in, the user account and the password are stored in the storage unit 202, and the control unit 201 sends the user account and the password stored in the storage unit 202. If the stationary game terminal 200 does not automatically log in, the control unit 201 displays a screen for entering a user account and a password on the display device 207, and sends the user account and the password entered from the screen.

When the game server 300 receives the user account and the password, the control unit 301 determines whether the authentication is successful (S103). In S103, the control unit 301 determines whether the user account and the password stored in the storage unit 302 match to the user account and the password received from the stationary game terminal 200. When it is determined that they are matched, the control unit 301 determines that the authentication is successful, and when it is determined that they are not matched, the control unit 301 determines that the authentication is failed.

If it is determined that the authentication is failed (S103; N), the control unit 301 sends a predetermined error message (S104). When the stationary game terminal 200 receives the error message, the control unit 201 displays the error message on the display device 207 (S105), and the processing terminates.

On the other hand, if it is determined that the authentication is successful (S103; Y), the control unit 301 generates and sends a token to the stationary game terminal 200 (S106). In S106, the control unit 301 generates a token based on a predetermined token generation algorithm (here, symbol string generation algorithm). The token to be generated in S106 is different from tokens already generated for other user accounts. The control unit 301 stores the token generated in S106 in the storage unit 302 in association with the user account.

When the stationary game terminal 200 receives the token, the control unit 201 stores the received token in the storage unit 102 (S107). The control unit 101 uploads information relating to the game executed in the stationary game terminal 200 to the game server 300 by using the token stored in the storage unit 102 (S108). In S108, the control unit 101 generates information for identifying a game executed in the stationary game terminal 200 and information about the progress of the game. Such information may be stored in the storage unit 102 in advance. The control unit 101 uploads such information in the game server 300 together with the token.

When the game server 300 receives the token and the information about the game, the control unit 301 changes the status information of the user to on-line (S109), and stores the received information in the storage unit 302 as the play information of the user (S110). In S109, the control unit 301 specifies a user account based on the received token. The control unit 301 changes the status information associated with the specified user account to on-line. Subsequently, in S110, the control unit 301 updates the play information associated with the specified user account based on the received information about the game.

By the above processing, the status information and the play information are updated. In the following, the control unit 201 executes the main game in the stationary game terminal 200 and various setting processing, for example. The stationary game terminal 200 may appropriately upload information about the game to the game server 300, and appropriately update the play information. In this case as well, similarly to the above description, the information about the game is uploaded together with the token.

The control unit 201 determines whether the predetermined log-out condition is satisfied (S111). The log-out condition is a condition for logging out of the game server 300, and for example, whether the user performs a predetermined log-out operation, or whether the power of the stationary game terminal 200 is turned off. If it is determined that the log-out condition is satisfied (S111; Y), a predetermined log-out request is sent to the game server 300 (S112).

When the game server 300 receives the log-out request, the control unit 301 executes a predetermined log-out processing and changes the status information to off-line (S113), and the processing terminates. In S113, the control unit 301 changes the status information associated with the user account to off-line.

The play information storing processing described above is executed, and whereby the game server 300 stores the play information. As such, in the backup controlling processing described later, it is possible to specify whether the user who operates the portable game terminal 100 also plays the main game.

[Backup Controlling Processing]

FIGS. 11 to 14 are flow charts indicating the backup controlling processing. The backup controlling processing is executed, in the portable game terminal 100, when the control unit 101 starts a game program stored in the storage unit 102. The processing shown in FIGS. 11 to 14 is executed when the control units 101, 201, 301, and 401 operate according to programs stored in the storage units 102, 202, 302, and 402, respectively.

Figure 11:
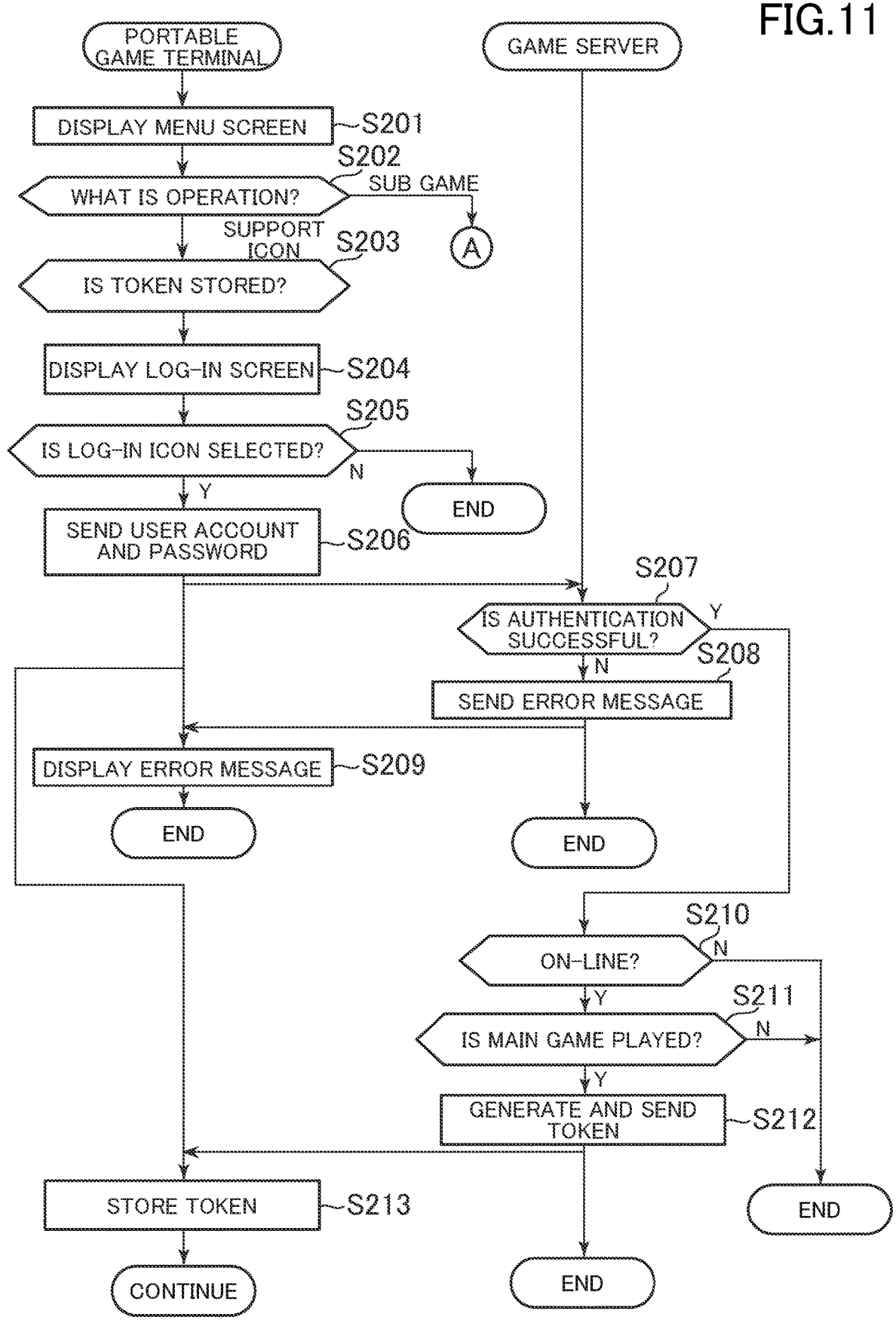
FIG. 11 is a flow chart indicating backup controlling processing.
Figure 12:
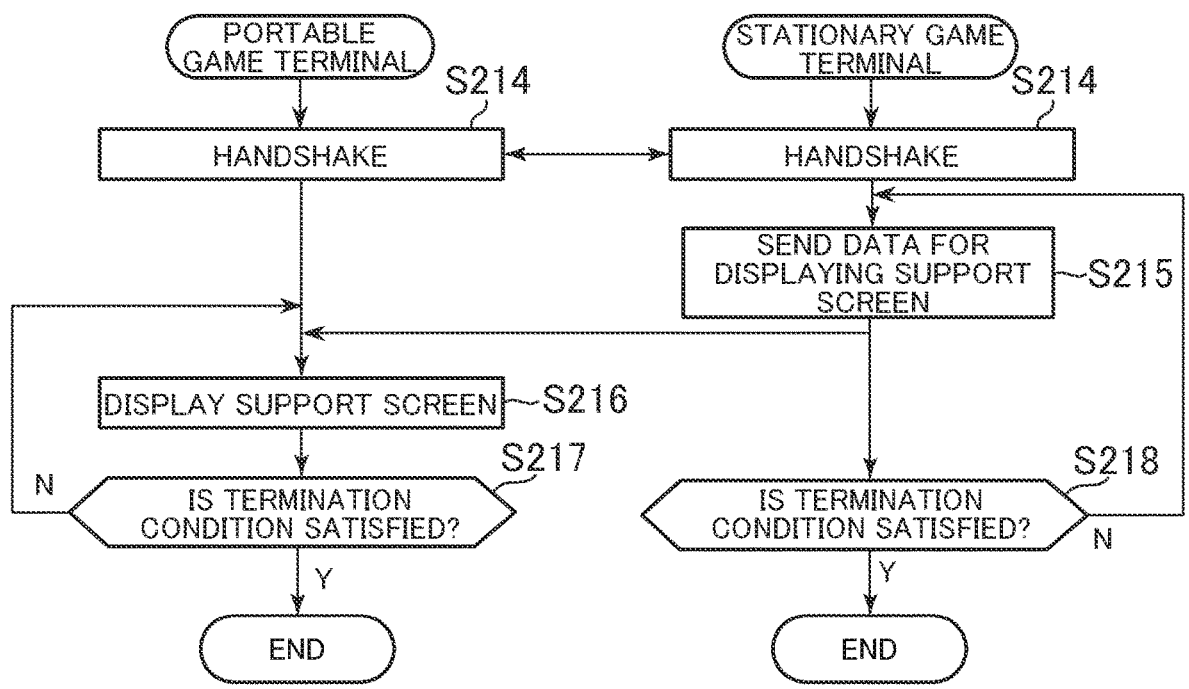
FIG. 12 is a flow chart indicating backup controlling processing.

As shown in FIG. 11, the control unit 101 displays a menu screen 1000 on the display unit 105 (S201). The control unit 101 specifies an operation from the input unit 104 (S202). In S202, the control unit 101 determines which one of a support icon 1001 and a sub game icon 1002 is selected.

If the support icon 1001 is selected by the user (S202; support icon), the control unit 101 determines whether a token is stored in the storage unit 102 (S203). The processing in S203 is the same as that in S101. If a token is not stored in the storage unit 102 (S203; N), the control unit 101 displays a log-in screen 1010 on the display unit 105 (S204). When the log-in screen 1010 is displayed in S204, inputs to input forms 1011 and 1012 are received.

The control unit 101 determines whether the log-in icon 1014 is selected based on a signal from the input unit 104 (S205). If it is determined that the log-in icon 1014 is selected (S205; Y), the control unit 101 sends the user account entered in the input form 1011 and the password entered in the input form 1012 to the game server 300 (S206).

The following processing in S207 to S209 is the same as that in S103 to S105. That is, if the authentication is failed, the game server 300 sends an error message to the portable game terminal 100, and the error message is displayed on the portable game terminal 100.

On the other hand, if the authentication is successful (S207; Y), the control unit 301 refers to the status information, and determines whether the stationary game terminal 200 is on-line status (S210). In S210, the control unit 301 determines whether the stationary game terminal 200 is on-line or off-line by referring to the status information associated with the user account.

If it is determined that the stationary game terminal 200 is on-line (S210; Y), the control unit 301 refers to the play information and determines whether the user plays the main game (S211). In S211, the control unit 301 refers to the play information associated with the user account and determines whether the play information indicates that the user has played the main game. In this regard, if the play information includes information for identifying the game currently executed in the stationary game terminal 200, the control unit 301 may determine in S211 whether the user is currently playing the main game in the stationary game terminal 200.

If it is determined the main game is played (S211; Y), the control unit 301 generates and sends a token to the portable game terminal 100 (S212). The processing in S212 is the same as that in S106. Here, the processing in S210 and S211 is executed earlier, although the processing in S212 may be executed earlier.

When the portable game terminal 100 receives a token, the control unit 101 stores the token in the storage unit 102 (S213). The processing in S213 is the same as that in S107. Subsequently, moving to FIG. 12, a handshake is performed between the portable game terminal 100 and the stationary game terminal 200 (S214). The handshake is processing for establishing communication between the portable game terminal 100 and the stationary game terminal 200. For example, when it is determined that the portable game terminal 100 and the stationary game terminal 200 store the same token, communication is established. Various known methods can be applied to the method for establishing communication between the portable game terminal 100 and the stationary game terminal 200.

If the handshake is successful, the communication between the portable game terminal 100 and the stationary game terminal 200 is established, and the control unit 201 in the stationary game terminal 200 sends data for displaying the support screen 1020 to the portable game terminal 100 (S215). In S215, the control unit 201 reads at least apart of game situation data of the main game being executed from the storage unit 202, and sends the data to the portable game terminal 100.

When the portable game terminal 100 receives the data, the control unit 101 displays the support screen 1020 on the display unit 105 (S216). Subsequently, the user plays the main game in the stationary game terminal 200 while displaying the support screen 1020 on the portable game terminal 100.

The control unit 101 determines whether a termination condition is satisfied (S217). The termination condition is a condition for terminating a display of the support screen 1020, for example, whether the user has performed a predetermined operation to terminate the display of the support screen 1020, or whether a notice to terminate the main game is received from the stationary game terminal 200. If it is determined that the termination condition is satisfied (S217; Y), the processing terminates. On the other hand, if it is determined that the termination condition is not satisfied (S217; N), the processing goes back to S216, and the data from the stationary game terminal 200 is received and the display of the support screen 1020 is updated.

Similarly, the control unit 201 in the stationary game terminal 200 determines whether a termination condition is satisfied (S218). The termination condition is a condition for terminating the main game, for example, whether the user has performed a predetermined operation to terminate the main game, or whether the main game is over or completed (e.g., whether a subject in the game is accomplished). If it is determined that the termination condition is satisfied (S218; Y), the processing terminates. On the other hand, if it is determined that the termination condition is not satisfied (S218; N), the processing goes back to S215, and data for displaying the support screen 1020 is sent to the portable game terminal 100.

Figure 13:
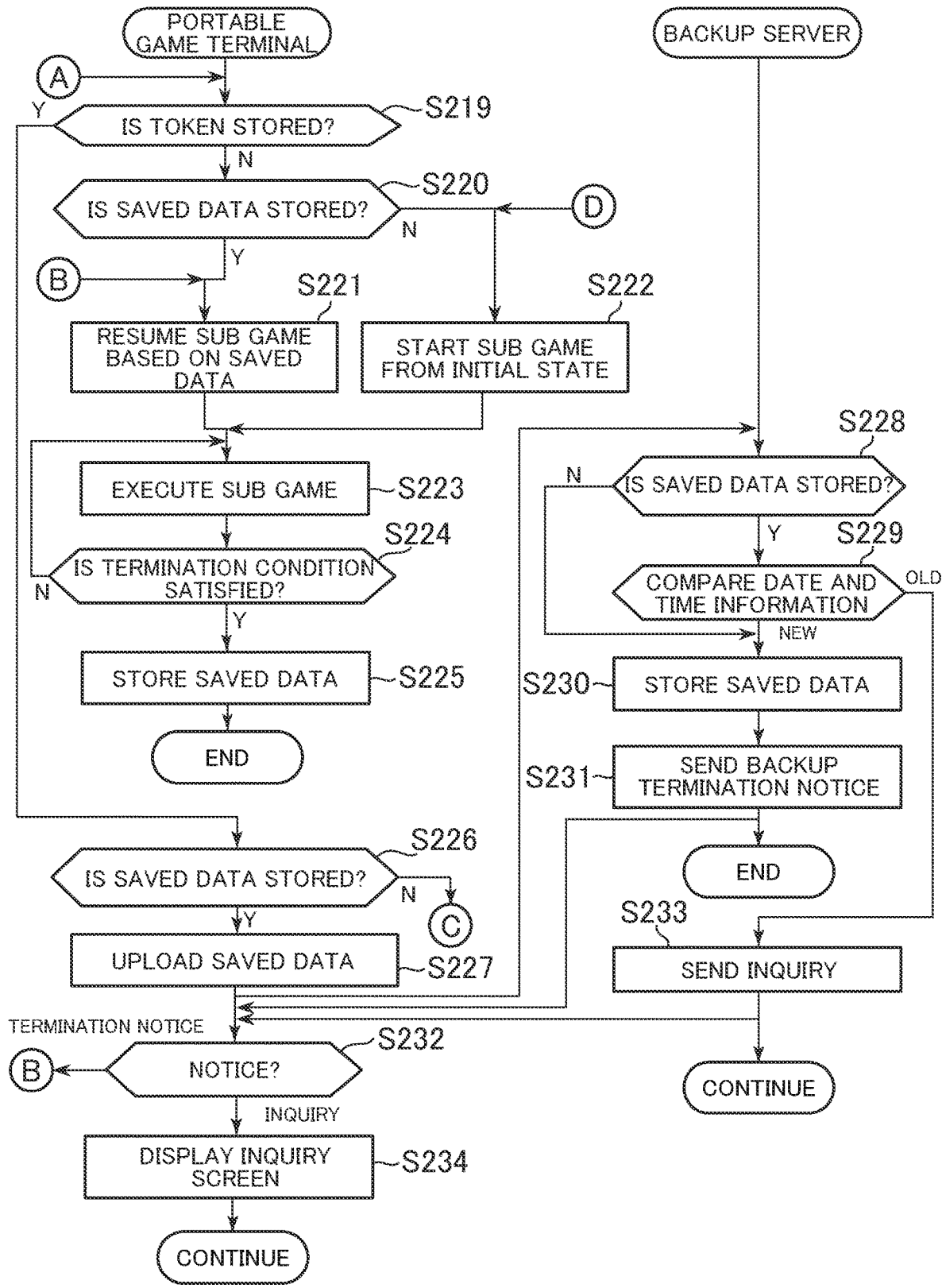
FIG. 13 is a flow chart indicating backup controlling processing.
Figure 14:
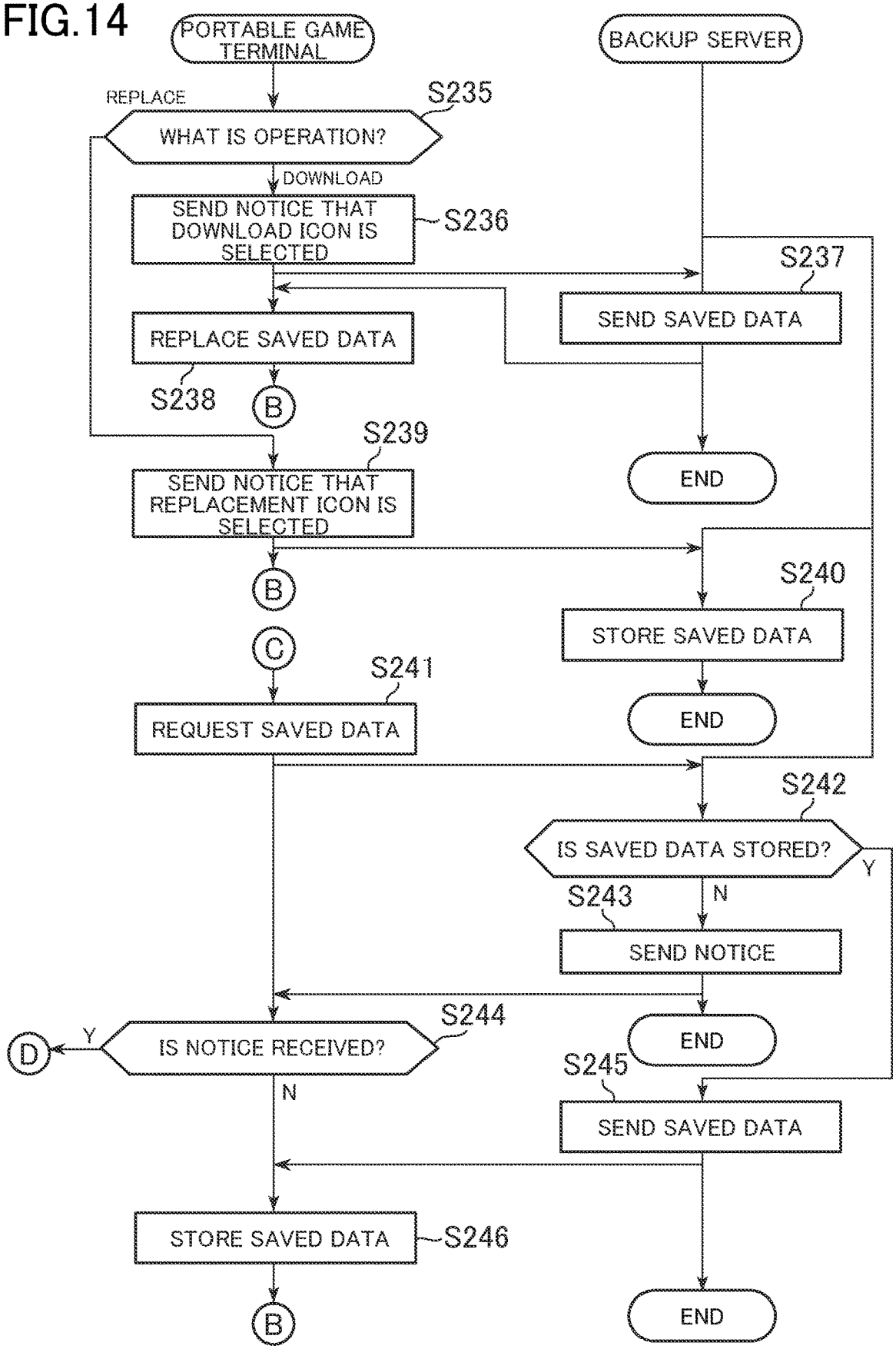
FIG. 14 is a flow chart indicating backup controlling processing.

Referring back to FIG. 11, if the user selects a sub game icon 1002 in S202 (S202; sub game icon), proceeding to FIG. 13, the control unit 101 determines whether the storage unit 102 stores a token (S219). The processing in S219 is the same as that in S203. If it is determined that a token is not stored in the storage unit 102 (S219; N), the control unit 101 determines whether saved data of the sub game is stored in the storage unit 102 (S220).

If it is determined that the saved data of the sub game is stored in the storage unit 102 (S220; Y), the control unit 101 resumes the sub game based on the saved data (S221). In S221, the control unit 101 generates game situation data based on the saved data, and stores the game situation data in the storage unit 102. Subsequently, the control unit 101 displays a sub game screen 1030 based on the game situation data to resume the sub game.

On the other hand, if it is determined that the saved data of the sub game is not stored in the storage unit 102 (S220; N), the control unit 101 starts the sub game from an initial state (S222). In S222, the control unit 101 generates game situation data in the initial state, stores the data in the storage unit 102, and starts the sub game from the beginning.

The control unit 101 executes the sub game based on the user's operation (S223). In S223, the control unit 101 updates the game situation data indicating the current situation of the sub game based on the user's operation.

The control unit 101 determines whether the termination condition of the sub game is satisfied (S224). The termination condition is a predetermined condition for terminating a sub game, for example, whether the user has performed a predetermined termination operation. If it is determined that the termination condition of the sub game is satisfied (S224; Y), the control unit 101 generates saved data based on the game situation data stored in the storage unit 102 and stores the saved data in the storage unit 102 (S225). In S225, the control unit 101 stores the generated saved data in the storage unit 102 in association with date and time information indicating the current date and time.

On the other hand, if it is determined that the storage unit 102 stores a token (S219; Y), the control unit 101 determines whether the saved data of the sub game is stored in the storage unit 102 (S226). The processing in S226 is the same as that in S220. If the saved data is stored in the storage unit 102 (S226; Y), the control unit 101 uploads the saved data of the sub game to the backup server 400 together with the token stored in the storage unit 102 (S227). In S227, the control unit 101 is described as also uploading the date and time information together with the saved data.

In the backup server 400, the control unit 401 specifies a user account based on the token, and determines whether the storage unit 402 stores saved data associated with the account (S228). In this regard, the storage unit 402 may store data indicating association between the token and the user account, and the backup server 400 may request the game server 300 to provide the user account corresponding to the token.

If it is determined that the saved data is stored in the storage unit 402 (S228; Y), the control unit 401 compares the date and time information associated with the saved data received from the portable game terminal 100 with the date and time information associated with the saved data stored in the storage unit 402 (S229). In S229, the control unit 401 determines which of the date and time information associated with the saved data received from the portable game terminal 100 and the date and time information associated with the saved data stored in the storage unit 402 is newer or older.

If the saved data received from the portable game terminal 100 is newer (S229; new), the control unit 401 stores the received saved data in the storage unit 402 (S230), and send a backup termination notice indicating that the backup terminates (S231). In S230, the control unit 401 replaces the old saved data stored in the storage unit 402 with the received new saved data.

In the portable game terminal 100, the control unit 101 refers to the notice received from the backup server 400 (S232). When the backup termination notice is received from the backup server 400 (S232; termination notice), the processing proceeds to S221. In this case, the sub game resumes based on the saved data.

On the other hand, in S229, the saved data received from the portable game terminal 100 is older (S229; old), the control unit 401 sends an inquiry about whether to download the saved data stored in the storage unit 402 (S233). The inquiry includes information (e.g., date and time information) about the saved data stored in the backup server 400.

If the portable game terminal 100 receives an inquiry in S232 (S232; inquiry), the control unit 101 displays an inquiry screen on the display unit 105 for a user to select whether to download the saved data based on the received inquiry (S234).

Figure 15:
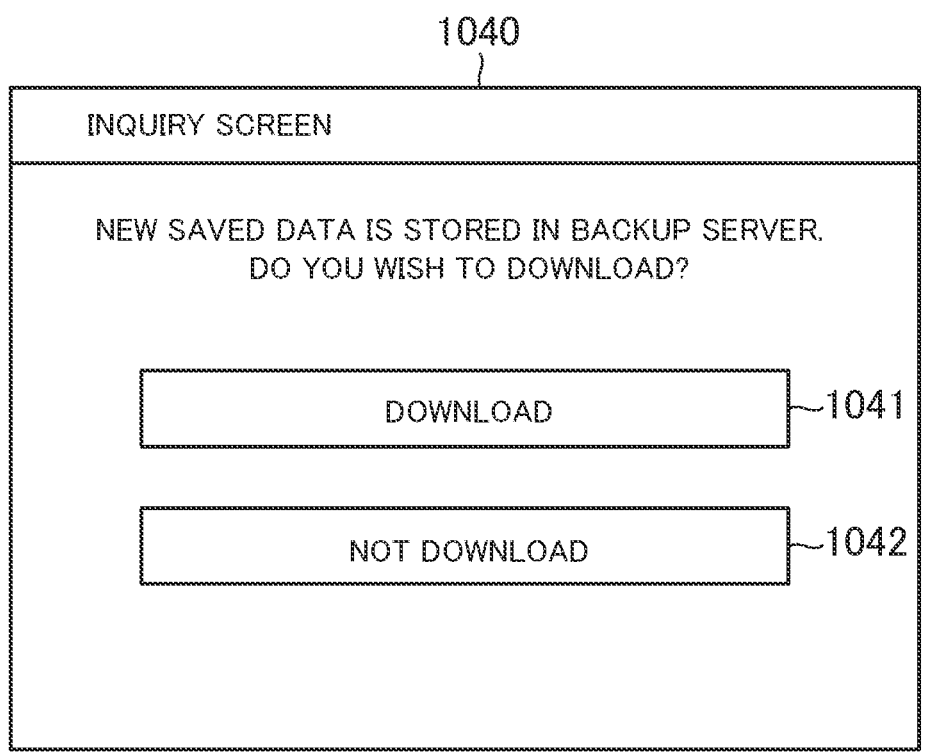
FIG. 15 is a diagram illustrating an example of an inquiry screen.

FIG. 15 illustrates an example of an inquiry screen. As shown in FIG. 15, an inquiry screen 1040 displays a download icon 1041 for downloading the saved data stored in the backup server 400 and a replacement icon 1042 for storing, in the backup server 400, the saved data stored in the storage unit 102 without downloading the saved data stored in the backup server 400.

The control unit 101 specifies an operation from the input unit 104 (S235). In S235, the control unit 101 determines which of the download icon 1041 and the replacement icon 1042 is selected.

If it is determined that the download icon 1041 is selected (S235; download), the control unit 101 sends a notice that the download icon 1041 is selected to the backup server 400 (S236). When the backup server 400 receives the notice that the download icon 1041 is selected, the control unit 401 sends the saved data stored in the storage unit 402 to the portable game terminal 100 (S237).

When the portable game terminal 100 receives the saved data, the control unit 101 replaces the saved data originally stored in the storage unit 102 with the received saved data (S238), and proceeds to the processing in S221. In this case, the sub game resumes based on the saved data received from the backup server 400.

On the other hand, if the replacement icon 1042 is selected (S235; replace), the control unit 101 sends a notice that the replacement icon 1042 is selected to the backup server 400 (S239), and proceeds to the processing in S221. In this case, the sub game resumes based on the saved data originally stored in the storage unit 102.

When the backup server 400 receives the notice that the replacement icon 1042 is selected, the control unit 401 stores the received saved data in the storage unit 402 (S240). In S240, the control unit 401 replaces the saved data stored in the storage unit 402 with the received saved data.

Referring back to FIG. 13, if the saved data is not stored in the storage unit 102 in S226 (S228; N), proceeding to FIG. 14, the control unit 101 requests the backup server 400 to provide saved data as well as the token stored in the storage unit 102 (S241).

When the backup server 400 receives the request, the control unit 401 determines whether the saved data is stored in the storage unit 402 (S242). In S242, the control unit 401 specifies a user account based on the received token. The control unit 401 then determines whether there is saved data associated with the specified user account.

If it is determined that the saved data is not stored in the storage unit 402 (S242; N), the control unit 401 sends a notice that the saved data is not stored in the storage unit 402 to the portable game terminal 100 (S243). When the portable game terminal 100 receives the notice that the saved data is not stored in the storage unit 402 (S244; Y), the processing proceeds to S222. In this case, the saved data is not stored in the portable game terminal 100 nor the stationary game terminal 200, and thus the sub game starts from an initial state.

On the other hand, if it is determined that saved data is stored in the storage unit 402 in S242 (S242; Y), the control unit 401 sends the saved data to the portable game terminal 100 (S245). When the portable game terminal 100 receives the saved data, the control unit 101 stores the received saved data in the storage unit 102 (S246), and proceeds to the processing in S221. In this case, the sub game resumes based on the saved data received from the backup server 400.

According to the game system S described above, the saved data of the sub game is controlled to be stored based on the determination result whether the main game has been played by the user of the portable game terminal 100, and thus it is possible to induce the user who plays the sub game to play the main game as well. For example, a user who plays not only a sub game but also a main game is allowed to store saved data of the sub game in the backup server 400, and a user who plays only a sub game and not a main game is prohibited to store the saved data of the sub game in the backup server 400. This enables to differentiate these users and induce the user who plays the sub game to play the main game in order to achieve high convenience. Further, a token is used for performing a control for storing the saved data, and whereby the control for storing the saved data can be performed without sending and receiving personal information on the network NW.

The saved data of the sub game played by the user is stored in the backup server 400 in association with the user account, which facilitates management of the saved data in the backup server 400. Further, the saved data is stored in the backup server 400 in association with the user account issued by the game server 300, which enables the user to backup the saved data by using the user account issued with use of the stationary game terminal 200. That is, the backup server 400 does not need to issue a new user account.

In addition, even if the portable game terminal 100 does not store the saved data, the portable game terminal 100 can store the saved data stored in the backup server 400, and thus the user can resume the sub game from where the game was terminated previously. For example, if the saved data disappears from the portable game terminal 100 or the user newly purchases a portable game terminal 100, the user can resume the sub game from where the game was terminated previously. Further, the backup server 400 stores saved data in association with user accounts, and thus the sub game can be resumed based on the saved data of the user whose saved data is not stored in the portable game terminal 100.

In addition, the support screen 1020 for supporting the play of the main game is displayed on the display unit 105 of the portable game terminal 100, and thus it is possible to induce the user who has the portable game terminal 100 to play the main game.

Further, if the saved data stored in the backup server 400 is newer than the saved data stored in the storage unit 102 of the portable game terminal 100, the older saved data can be replaced with the saved data stored in the backup server 400, and thus the newest saved data can be stored.

2. Second Embodiment

In the first embodiment, the case is explained in which the number of the stationary game terminal 200 used by the user for playing the main game is one, although the user may select a stationary game terminal 200 to play the main game from a plurality of consoles (platforms). A console (platform) is a game terminal conforming to the standard of a game, and can be described as a type of a game terminal.

In the second embodiment described below, processing is explained in which a user plays a main game by using at least one of a stationary game terminal 200A (first type) conforming to a first game standard and a stationary game terminal 200B (second type) conforming to a second game standard. For example, if types and manufacturers of the stationary game terminal 200A and the stationary game terminal 200B are different to each other, the games may not be interchangeable to each other. In the second embodiment, description of the part that is the same as in the first embodiment will be omitted, and the different part will be explained.

Figure 16:
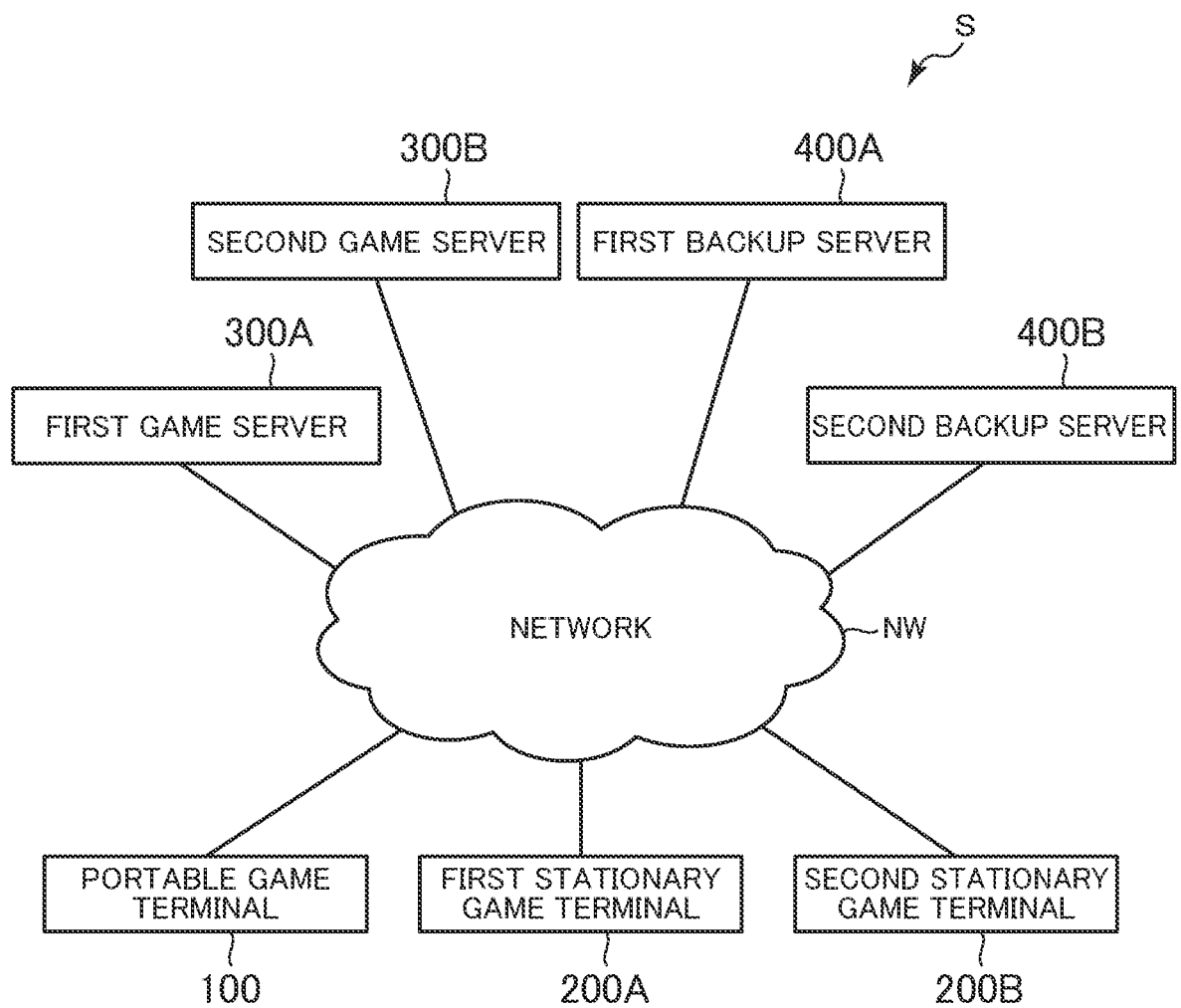
FIG. 16 is a diagram illustrating an example of system configuration of a game system according to a second embodiment.

FIG. 16 is a diagram illustrating an example of a game system configuration according to the second embodiment. As shown in FIG. 16, a game system S in the second embodiment includes a portable game terminal 100, a first stationary game terminal 200A, a second stationary game terminal 200B, a first game server 300A, a second game server 300B, a first backup server 400A, and a second backup server 400B.

Each of hardware configurations of the first stationary game terminal 200A and the second stationary game terminal 200B is the same as that of the stationary game terminal 200 described in the embodiment. Each of hardware configurations of the first game server 300A and the second game server 300B is the same as that of the stationary game terminal 200 described in the embodiment. Each of hardware configurations of the first backup server 400A and the second backup server 400B is the same as that of the stationary backup server 400 described in the embodiment.

Here, a game executed in the first stationary game terminal 200A is managed by the game server 300A, and a game executed in the second stationary game terminal 200B is managed by the game server 300B. For example, the game server 300A is under the management of a company that sells the first stationary game terminal 200A, and the game server 300B is under the management of a company that sells the second stationary game terminal 200B. A user operates the first stationary game terminal 200A to issue a first user account to log in the game server 300A, and operates the second stationary game terminal 200B to issue a second user account to log in the game server 300B.

Figure 17:
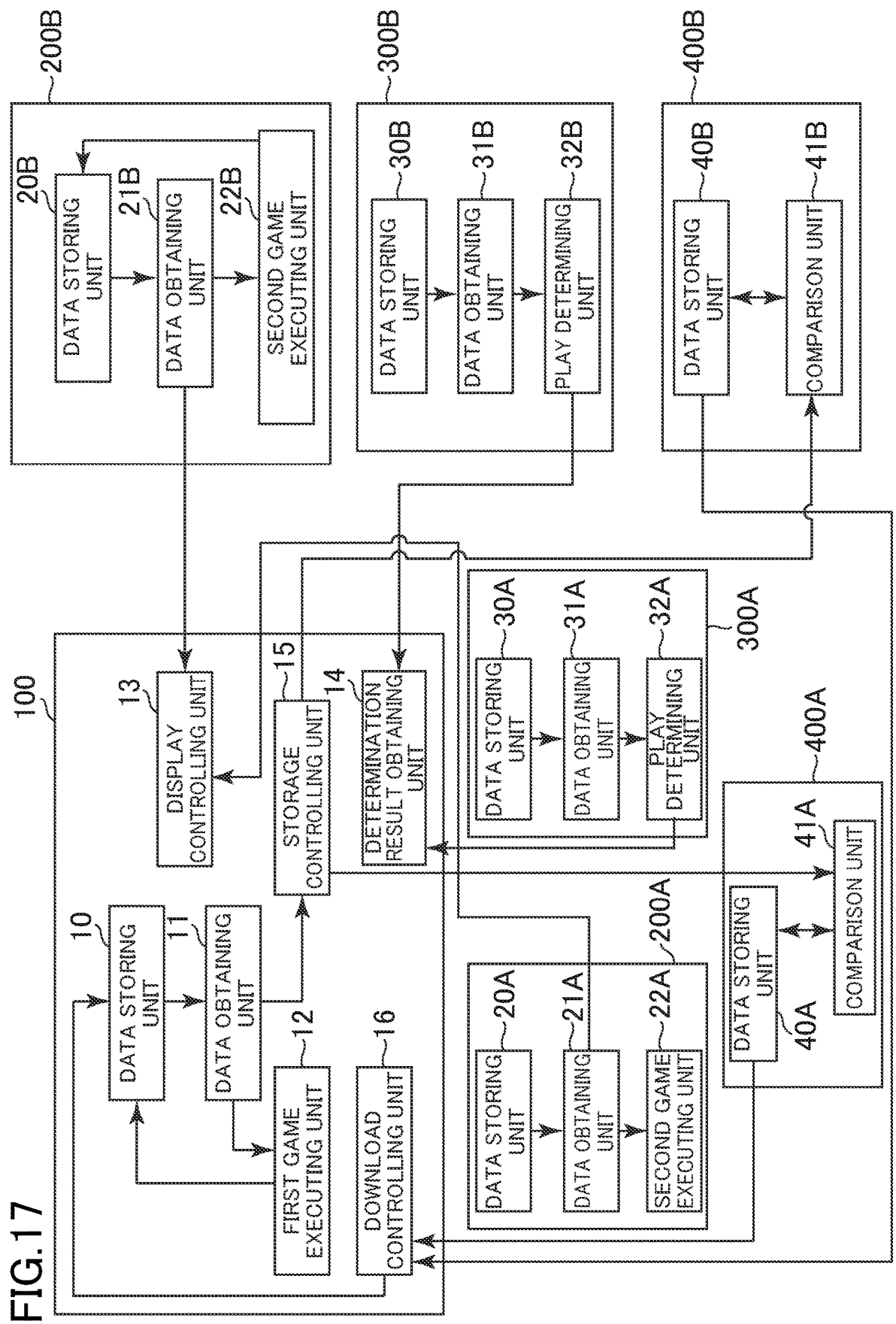
FIG. 17 is a functional block diagram of the second embodiment.

FIG. 17 is a functional block diagram of the second embodiment. As shown in FIG. 17, in the second embodiment, the same functions as those of the stationary game terminal 200 described in the embodiment are implemented in each of the first stationary game terminal 200A and the second stationary game terminal 200B. Further, the same functions as those of the stationary game terminal 200 described in the embodiment are implemented in each of the first game server 300A and the second game server 300B. Further, the same functions as those of the stationary backup server 400 described in the embodiment are implemented in each of the first backup server 400A and the second backup server 400B.

Here, a user account to log in the first game server 300A is the first user account, and a user account to login the second game server 300B is the second user account. Although the play information respectively stored in the data storing unit 20A and the data storing unit 20B is the same as described in the first embodiment, the play information is described herein as being stored in the data storing unit 20A in association with the first user account, and the play information is described herein as being stored in the data storing unit 20B in association with the second user account.

As shown in FIG. 17, a selection receiving unit 17 is implemented in the portable game terminal 100. The selection receiving unit 17 is implemented mainly by the control unit 101 and the input unit 10. The selection receiving unit 17 receives a selection of either one of the first stationary game terminal 200A and the second stationary game terminal 200B as a terminal to play the main game. For example, if the user selects a support icon 1001, a selection screen 1050 for selecting a console to play the main game is displayed.

Figure 18:
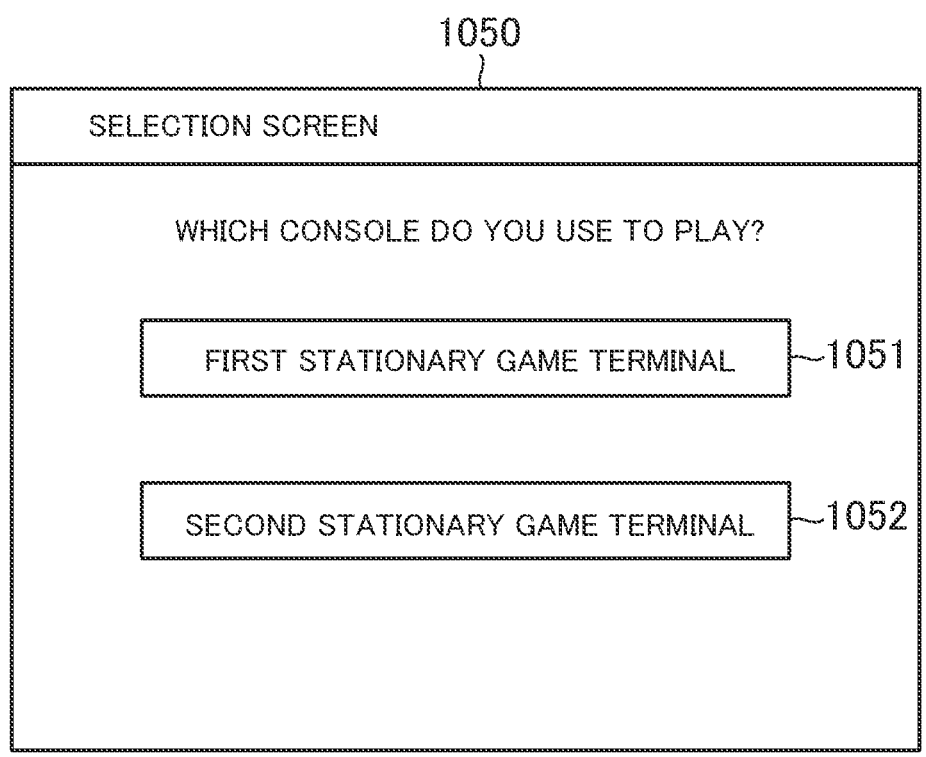
FIG. 18 is a diagram illustrating an example of a selection screen.

FIG. 18 is a diagram illustrating an example of a selection screen. As shown in FIG. 18, the selection screen 1050 displays a first icon 1051 for selecting the first stationary game terminal 200A and a second icon 1052 for selecting the second stationary game terminal 200B. If the first icon 1051 is selected, a log-in screen for entering the first user account and the first password to log in the first game server 300A is displayed. On the other hand, if the second icon 1052 is selected, a log-in screen for entering the second user account and the second password to log in the second game server 300B is displayed. The log-in screen is the same as described in FIG. 3, so its explanation will be omitted.

If the first stationary game terminal 200A is selected by the user, the play determining unit 32A determines whether the main game executed in the first stationary game terminal 200A is played by the user based on the play information stored in association with the first user account. The determining method of the play determining unit 32A is the same as described in the first embodiment.

If it is determined that the main game is played by the user on the first stationary game terminal 200A, the storage controlling unit 15 performs a control for storing the first user account and the saved data of the sub game stored in the data storing unit 10 in association with each other in the backup server 400A. The control is the same as described in the first embodiment, although the storage controlling unit 15 controls not the backup server 400B but the backup server 400A to store the saved data. On the other hand, if the second stationary game terminal 200B is selected by the user, the play determining unit 32B determines whether the main game executed in the second stationary game terminal 200B is played by the user based on the play information stored in association with the second user account. The determining method of the play determining unit 32B is the same as described in the first embodiment.

If it is determined that the main game is played by the user in the second stationary game terminal 200B, the storage controlling unit 15 performs a control for storing the second user account and the saved data of the sub game stored in the data storing unit 10 in association with each other in the backup server 400B. Here, a case is explained in which the backup server 400B different from the backup server 400A stores the data, although the backup server 400A may store the data.

According to the game system S in the second embodiment, the saved data can be stored in association with the user account of the terminal selected by the user as a terminal to play the main game. As such, for example, if the user changes the terminal to play the main game from the first stationary game terminal 200A to the second stationary game terminal 200B, it is possible to back up the saved data of the sub game.

[3. Variation]

The present invention is not to be limited to the above described embodiment, and can be changed as appropriate without departing from the spirit of the invention.

For example, in the above description, the case is explained in which the game program executed in the portable game terminal 100 executes at least the processing for displaying the support screen 1020 and the processing enabling the user to play the sub game, although the processing for display the support screen 1020 may not be performed, and the game program may only execute the sub game.

For example, the determining method of the play determining unit 32 may not be limited to the method described above. If the data storing unit 30 stores database that stores a list of user accounts of users who have played the main game, the play determining unit 32 determines whether the list includes the user account entered by the user who has played the sub game.

For example, the play information indicates the user who has played the main game, although the play information may indicate the user who has purchased the main game. That is, the play information indicating that the user has purchased the main game may be stored in association with the user account. In this case, the play determining unit 32 assumes the user who has purchased the main game to be the user who plays the main game.

For example, the timing for performing a control for storing saved data is not limited to the timing for selecting the sub game icon 1002. The control for storing the saved data may be performed when the sub game is terminated, or at any time during the sub game.

For example, the case has been discussed in which the storage controlling unit 15 determines whether to permit storing of the saved data, although a control for storing the saved data is not limited to this. Alternatively, the storage controlling unit 15 may determine a server in which the saved data is backed up from a plurality of servers based on the determination result of the play determining unit 32. For example, if it is determined that the main game has been played by the user, the saved data may be stored in a higher-quality backup server 400 than a case where it is determined that the main game has not been played by the user. "Higher-quality" means that the backup server 400 has larger storage capacity, higher upload/download speed, and higher security.

For example, although the above has explained the case where the saved data is stored in the backup server 400, the saved data may be stored in a server device. The game server 300 may store the saved data, or another server may exist and store the saved data. Further, in the above description, the portable game terminal 100 directly sends the saved data, although the saved data may be uploaded through the stationary game terminal 200 or other computers.

For example, each of the functions described above may be implemented in one of computers in the game system S.

For example, the data obtaining unit 11 for obtaining the saved data, the determination result obtaining unit 14, and the storage controlling unit 15 may be implemented by the backup server 400. In this case, the data obtaining unit 11 and the determination result obtaining unit 14 are implemented mainly by the control unit 401 and the communication unit 403, respectively, and the storage controlling unit 15 is implemented mainly by the control unit 401. The data obtaining unit 11 obtains the saved data stored in the data storing unit 10 through the network NW. The determination result obtaining unit 14 obtains the determination result of the play determining unit 32 through the network NW, and the storage controlling unit 15 performs a control by obtaining the determination result of the play determining unit 32 obtained through the network NW.

Further, for example, the play determining unit 32 may be implemented by the backup server 400. In this case, the play determining unit 32 is implemented mainly by the control unit 401. The backup server 400 obtains play information through the network NW, and the play determining unit 32 determines whether the main game is played by the user based on the obtained play information. The determining method is the same as described above.

Further, for example, the play determining unit 32 may be implemented by the portable game terminal 100. In this case, the play determining unit 32 is implemented mainly by the control unit 101. The portable game terminal 100 obtains play information through the network NW, and the play determining unit 32 determines whether the main game is played by the user based on the obtained play information. The determining method is the same as described above.

Further, for example, the play determining unit 32 may be implemented by the stationary game terminal 200. In this case, the play determining unit 32 is implemented mainly by the control unit 201. The stationary game terminal 200 may obtain play information through the network NW, or store the similar data in the data storing unit 20. The play determining unit 32 determines whether the main game is played by the user based on the obtained play information. The determining method is the same as described above.

Further, for example, the comparison unit 41 may be implemented by the portable game terminal 100. In this case, the comparison unit 41 is implemented mainly by the control unit 101. The comparison unit 41 compares date and time information associated with the saved data obtained from the backup server 400 with date and time information associated with the saved data stored in the data storing unit 10.

Further, for example, the first game terminal and the second game terminal according to the present invention can be respectively applied to various computers other than the portable game terminal and the stationary game terminal. The functions of the game server and the backup server may be implemented by a single server computer. Further, the storage controlling device may be implemented by a computer other than a portable game terminal. The computers included in the game system are not limited to the example of the embodiment, and a plurality of first game terminals, second game terminals, and server devices may be provided respectively. In addition, the first game and the second game are not limited to the sub game and the main game, respectively, but may be various types of games. The first game may be a game executed based on the saved data, and the second game may be a game different from the first game.

[4. Supplemental]

The present invention is summarized as follows, for example, based on the foregoing descriptions. A game system (S) according to the present invention includes at least one processor configured to: obtain saved data of a first game, the saved data being stored in a storage included in a first game terminal that executes the first game; determine whether a second game that is executed in a second game terminal is played by a user of the first game terminal; and perform a control for storing, in a server device, the saved data of the first game stored in the storage based on a determination result of the determination.

A storage controlling device (100) according to the present invention includes at least one processor configured to: obtain saved data of a first game, the saved data being stored in a storage included in a first game terminal that executes the first game; obtain a determination result that indicates whether a second game that is executed in a second game terminal is played by a user of the first game terminal; and perform a control for storing, in a server device, the saved data of the first game stored in the storage based on the determination result.

A program according to the present invention causes a computer to function as the game system described above or below, or the storage controlling device described above.

An information storage medium according to the present invention is a computer-readable information storage medium that stores the program described above.

In one aspect of the present invention, the at least one processor: obtaining content stored in a storage that stores play information relating to a play of the second game executed in the second game terminal in association with user identifying information; determining whether the second game is played by the user based on the play information stored in association with the user identifying information entered in the first game terminal; and performing, if it is determined that the second game is played by the user, a control for storing, in the server device, the user identifying information and the saved data of the first game stored in the storage in association with each other.

In one aspect of the present invention, the first game terminal obtaining, if the saved data of the first game is not stored in the storage, the saved data that is stored in the server device in association with the user identifying information entered in the first game terminal, and storing the obtained saved data in the storage.

In one aspect of the present invention, the at least one processor causes the first game terminal to display a screen for supporting the play of the second game on a display included in the first game terminal if the first game terminal is capable of communicating with the second game terminal executing the second game, based on data that relates to the second game and is supplied from the second game terminal.

In one aspect of the present invention, the at least one processor obtaining, if the saved data of the first game is not stored in the storage, the saved data of the first game stored in the server device, and storing the obtained saved data in the storage.

In one aspect of the present invention, the saved data of the first game being associated with date and time information relating to a date and time when the saved data is generated, and the at least one processor: comparing the date and time information associated with the saved data of the first game stored in the storage with date and time information associated with the saved data stored in the server device; and replacing the saved data stored in the storage with the saved data stored in the server device if a comparison result indicates that the saved data stored in the server device is newer than the saved data of the first game stored in the storage.

In one aspect of the present invention, the at least one processor: obtaining content stored in a storage that stores the play information relating to the play of the second game executed in the second game terminal in association with first user identifying information; obtaining content stored in a storage that stores the play information relating to the play of the second game executed in a third game terminal in association with second user identifying information; receiving, from the user, a selection of either one of the second game terminal and the third game terminal as a terminal to play the second game; determining, if the third game terminal is selected by the user, whether the second game executed in the third game terminal is played by the user based on the play information stored in association with the second user identifying information entered in the first game terminal; determining, if the second game terminal is selected by the user, whether the second game executed in the second game terminal is played by the user based on the play information stored in association with the first user identifying information entered in the first game terminal; performing, if it is determined that the second game is played by the user in the second game terminal, a control for storing the first user identifying information and the saved data of the first game stored in the storage in association with each other in the server device; and performing, if it is determined that the second game is played by the user in the third game terminal, a control for storing the second user identifying information and the saved data of the first game stored in the storage in association with each other in the server device or a server device different from the server device.

What is claimed is:

1. A game system comprising at least one processor configured to:
   obtain saved data of a first game, the saved data being stored in a storage included in a first game terminal that executes the first game, wherein the saved data is data indicating a situation of the first game at one point of time during a user play of the first game and reproducing the situation so as to enable the user to play the first game;
   determine whether a second game that is executed in a second game terminal is also played by the user who has already played the first game by using the first game terminal, wherein contents of the first game and contents of the second game are different than each other; and
   permit a backup server to back up the saved data if it is determined that the second game is also played by the user, and not permit the backup server to back up the saved data if it is determined that the second game is not played by the user;
   wherein the backup server stores a user account of the user and the saved data in association with one another if the backup is permitted and the saved data is uploaded to the backup server, and
   wherein the backup server permits the user to download the saved data associated with the user account, and does not permit the user to download saved data that is associated with another user account.

2. The game system according to claim 1, the at least one processor:
   obtaining content stored in a storage that stores play information relating to a play of the second game executed in the second game terminal in association with user identifying information;
   determining whether the second game is played by the user based on the play information stored in association with the user identifying information entered in the first game terminal; and
   performing, if it is determined that the second game is played by the user, a control for storing, in the backup server, the user identifying information and the saved data of the first game stored in the storage in association with each other.

3. The game system according to claim 2, the first game terminal obtaining, if the saved data of the first game is not stored in the storage, the saved data that is stored in the backup server in association with the user identifying information entered in the first game terminal, and storing the obtained saved data in the storage.

4. The game system according to claim 1, the at least one processor causes the first game terminal to display a screen for supporting the play of the second game on a display included in the first game terminal if the first game terminal is capable of communicating with the second game terminal executing the second game, based on data that relates to the second game and is supplied from the second game terminal.

5. The game system according to claim 1, the at least one processor obtaining, if the saved data of the first game is not stored in the storage, the saved data of the first game stored in the backup server, and storing the obtained saved data in the storage.

6. The game system according to claim 1,
   the saved data of the first game being associated with date and time information relating to a date and time when the saved data is generated, and
   the at least one processor:
      comparing the date and time information associated with the saved data of the first game stored in the storage with date and time information associated with the saved data stored in the backup server; and
      replacing the saved data stored in the storage with the saved data stored in the backup server if a comparison result indicates that the saved data stored in the backup server is newer than the saved data of the first game stored in the storage.

7. The game system according to claim 1, the at least one processor:
   obtaining content stored in a storage that stores the play information relating to the play of the second game executed in the second game terminal in association with first user identifying information;
   obtaining content stored in a storage that stores the play information relating to the play of the second game executed in a third game terminal in association with second user identifying information;
   receiving, from the user, a selection of either one of the second game terminal and the third game terminal as a terminal to play the second game;
   determining, if the third game terminal is selected by the user, whether the second game executed in the third game terminal is played by the user based on the play information stored in association with the second user identifying information entered in the first game terminal;
   determining, if the second game terminal is selected by the user, whether the second game executed in the second game terminal is played by the user based on the play information stored in association with the first user identifying information entered in the first game terminal;
   performing, if it is determined that the second game is played by the user in the second game terminal, a control for storing the first user identifying information and the saved data of the first game stored in the storage in association with each other in the server; and
   performing, if it is determined that the second game is played by the user in the third game terminal, a control for storing the second user identifying information and the saved data of the first game stored in the storage in association with each other in the server or a server different from the server.

8. A storage controlling device comprising at least one processor configured to:

obtain saved data of a first game, the saved data being stored in a storage included in a first game terminal that executes the first game, wherein the saved data is data indicating a situation of the first game at one point of time during a user play of the first game and reproducing the situation so as to enable the user to play the first game;

obtain a determination result that indicates whether a second game that is executed in a second game terminal is also played by the user who has already played the first game by using the first game terminal, wherein contents of the first game and contents of the second game are different than each other; and permit a backup server to back up the saved data if it is determined that the second game is also played by the user, and not permit the backup server to back up the saved data if it is determined that the second game is not played by the user;

wherein the backup server stores a user account of the user and the saved data in association with one another if the backup is permitted and the saved data is uploaded to the backup server, and wherein the backup server permits the user to download the saved data associated with the user account, and does not permit the user to download saved data that is associated with another user account.

9. A non-transitory computer-readable information storage medium having recorded thereon a program for causing a computer to:

obtain saved data of a first game, the saved data being stored in a storage included in a first game terminal that executes the first game, wherein the saved data is data indicating a situation of the first game at one point of time during a user play of the first game and reproducing the situation so as to enable the user to play the first game;

obtain a determination result that indicates whether a second game that is executed in a second game terminal is also played by the user who has already played the first game by using the first game terminal, wherein contents of the first game and contents of the second game are different than each other; and permit a backup server to back up the saved data if it is determined that the second game is also played by the user, and not permit the backup server to back up the saved data if it is determined that the second game is not played by the user;

wherein the backup server stores a user account of the user and the saved data in association with one another if the backup is permitted and the saved data is uploaded to the backup server, and wherein the backup server permits the user to download the saved data associated with the user account, and does not permit the user to download saved data that is associated with another user account.

* * * * *